(12) United States Patent
Bhattad et al.

(10) Patent No.: US 10,448,421 B2
(45) Date of Patent: Oct. 15, 2019

(54) CROSS-CARRIER SCHEDULING FOR WIRELESS DEVICES

(71) Applicant: QUALCOMM Incorporated, San Diego, CA (US)

(72) Inventors: Kapil Bhattad, Bangalore (IN); Alberto Rico Alvarino, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/719,030

(22) Filed: Sep. 28, 2017

(65) Prior Publication Data

US 2018/0270851 A1    Sep. 20, 2018

(30) Foreign Application Priority Data

Mar. 20, 2017   (IN) .............................. 201741009603

(51) Int. Cl.
*H04W 72/12*   (2009.01)
*H04W 72/14*   (2009.01)
(Continued)

(52) U.S. Cl.
CPC ... *H04W 72/1289* (2013.01); *H04W 72/0446* (2013.01); *H04W 72/14* (2013.01); *H04L 1/1812* (2013.01); *H04W 72/1242* (2013.01)

(58) Field of Classification Search
CPC ......... H04W 72/1289; H04W 72/0446; H04W 72/1294; H04W 72/1268; H04W 72/1273;
(Continued)

(56) References Cited

U.S. PATENT DOCUMENTS

2014/0022964 A1* 1/2014 Guan .................... H04L 1/1829
                                                            370/280
2015/0085720 A1    3/2015 Gaal et al.
2016/0330761 A1* 11/2016 Svedman .......... H04W 72/1289

FOREIGN PATENT DOCUMENTS

EP          2663146 A1    11/2013

OTHER PUBLICATIONS

CATT: "HARQ and Scheduling Timing Design for LTE sTTI", 3GPP Draft; R1-1702056, 3rd Generation Partnership Project (3GPP), Mobile Competence Centre: 650, Route Des Lucioles; F-06921 Sophia-Antipolis Cedex; France, vol. RAN WG1, no. Athens, Greece: 20170213-20170217, Feb. 12, 2017 (Feb. 12, 2017), 5 Pages, XP051209217, Retrieved from the Internet: URL: http://www.3gpp.org/ftp/Meetings_3GPP_SYNC/RAN1/Docs/ [retrieved on Feb. 12, 2017].

(Continued)

*Primary Examiner* — Obaidul Huq
(74) *Attorney, Agent, or Firm* — Holland & Hart LLP

(57) ABSTRACT

Methods, systems, and devices for wireless communication are described for cross-carrier scheduling for wireless devices. In an example, a wireless device may monitor a control channel on a first carrier of a plurality of carriers to obtain a grant allocating resources to the wireless device within a shared data channel. In some cases, a time duration between the grant and the allocated resources within the shared data channel is based at least in part on which carrier of the plurality of carriers transports the shared data channel. The wireless device may transmit or receive over the shared data channel using the allocated resources and based at least in part on the time duration.

30 Claims, 24 Drawing Sheets

(51) Int. Cl.
*H04W 72/04* (2009.01)
*H04L 1/18* (2006.01)
(58) Field of Classification Search
CPC .. H04W 72/14; H04W 72/1242; H04L 1/1812
USPC ........................................ 370/310, 328, 329
See application file for complete search history.

(56) References Cited

OTHER PUBLICATIONS

International Search Report and Written Opinion—PCT/US2018/019742—ISA/EPO—dated May 18, 2018.
Panasonic: "UE Processing Time in Case of Inter-Band Carrier Aggregation", 3GPP Draft; R4-104176, 3rd Generation Partnership Project (3GPP), Mobile Competence Centre; 650, Route Des Lucioles: F-06921 Sophia-Antipolis Cedex; France, vol. RAN WG4, no. Jacksonville; 20101115, Nov. 9, 2010 (Nov. 9, 2010), 3 Pages, XP050499402, [retrieved on Nov. 9, 2010].

* cited by examiner

CROSS-CARRIER SCHEDULING FOR WIRELESS DEVICES

CROSS REFERENCES

The present Application for Patent claims priority to India Provisional Patent Application No. 201741009603 by Bhattad, et al., entitled "Cross-Carrier Scheduling For Wireless Devices," filed Mar. 20, 2017, assigned to the assignee hereof.

BACKGROUND

The following relates generally to wireless communication, and more specifically to cross-carrier scheduling for wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

NarrowBand IoT (NB-IoT) is a low power wide area radio technology standard that enables IoT devices to connect using cellular telecommunications bands. NB-IoT enables a large number of connected IoT devices to communicate. IoT devices typically include a battery, and are designed to consume low amounts of power while handling fairly infrequent two-way data communication. NB-IoT technology can be deployed "in-band", meaning that spectrum allocated to a cellular network (e.g., LTE network) is used for communication. NB-IoT technology can also be in a standalone deployment in which IoT devices communicate using spectrum for IoT communication.

SUMMARY

The described techniques relate to improved methods, systems, devices, or apparatuses that support cross-carrier scheduling for wireless devices. Generally, the described techniques improve channel utilization and trunking efficiency. Scheduling latency is an issue in NB-IoT systems that use a single carrier. A base station may schedule a downlink transmission to a UE that tie up a single carrier for an extended amount of time, thereby preventing scheduling other UEs on the carrier. Configuring multiple carriers may somewhat mitigate the scheduling issue but trunking efficiency of conventional multi-carrier techniques is subpar.

As described herein, multiple carriers may be used for different types of uplink and downlink transmissions, and a time duration between scheduled uplink and downlink transmissions may be a function of whether a UE has to tune between carriers to transmit or receive using allocated resources. If on different carriers, a time duration between transmissions may include an added amount of time to enable the UE to tune between carriers. Beneficially, the UE may have an adequate amount of time to receive and decode transmissions from the base station, and transmit to the base station, using different carriers thereby providing for improved channel utilization and trunking efficiency.

A method of wireless communication is described. The method may include monitoring, by a wireless device, a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and transmitting or receiving over the shared data channel using the allocated resources and based at least in part on the time duration.

An apparatus for wireless communication is described. The apparatus may include means for monitoring a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and means for transmitting or receiving over the shared data channel using the allocated resources and based at least in part on the time duration.

Another apparatus for wireless communication is described. The apparatus may include a processor, memory in electronic communication with the processor, and instructions stored in the memory. The instructions may be operable to cause the processor to monitor a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and transmit or receiving over the shared data channel using the allocated resources and based at least in part on the time duration.

A non-transitory computer-readable medium for wireless communication is described. The non-transitory computer-readable medium may include instructions operable to cause a processor to monitor a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and transmit or receiving over the shared data channel using the allocated resources and based at least in part on the time duration.

In some examples of the method, apparatus, and non-transitory computer-readable medium described above, the time duration (e.g., a delay) between the grant and the allocated resources within the shared data channel may be based at least in part on whether cross-carrier scheduling is enabled. For example, if cross-carrier scheduling is enabled, a minimum delay between the grant and one of PDSCH or PUSCH is larger than a delay between the grant and the one PDSCH or PUSCH when cross-carrier scheduling is not enabled.

In some examples of the method, apparatus, and non-transitory computer-readable medium described above, the time duration between the grant and the allocated resources within the shared data channel may be further based at least in part on whether the scheduling on another carrier of the plurality of carriers is permissible, the other carrier being different from the carrier that transports the shared data channel.

In some examples of the method, apparatus, and non-transitory computer-readable medium described above, the time duration includes an added amount of time and a defined amount of time based at least in part on the transmitting or receiving occurring via a second carrier that differs from the first carrier.

Some examples of the method, apparatus, and non-transitory computer-readable medium described above may further include processes, features, means, or instructions, wherein, when multiple Hybrid Automatic Repeat reQuest (HARQ) processes may be enabled, the time duration includes an amount of time to enable the wireless device to receive a second instance of the control channel on the first carrier or a second carrier of the plurality of carriers prior to the transmitting or receiving over the shared data channel using the allocated resources.

In some examples of the method, apparatus, and non-transitory computer-readable medium described above, the time duration includes an amount of time between the second instance of the control channel and a beginning of the allocated resources.

Some examples of the method, apparatus, and non-transitory computer-readable medium described above may further include processes, features, means, or instructions for receiving a second grant within the second instance of the control channel, the second grant allocating second resources within the shared data channel at a time different than a time of the allocated resources.

Some examples of the method, apparatus, and non-transitory computer-readable medium described above may further include processes, features, means, or instructions for determining, based at least in part on first and second carrier indices, that the allocated resources and the second allocated resources may be not allocated on a same carrier of the plurality of carriers, wherein a time gap between a timing of the allocated resources and a timing of the second allocated resources may be based at least in part on the allocated resources and the second allocated resources not being on a same carrier.

Some examples of the method, apparatus, and non-transitory computer-readable medium described above may further include processes, features, means, or instructions for determining, based at least in part on first and second carrier indices, that a carrier of the plurality of carriers for a first uplink transmission differs from a carrier of the plurality of carriers for a second uplink transmission, wherein a time gap between a timing of the first uplink transmission and a timing of the second uplink transmission may be based at least in part on the carrier for the first uplink transmission differing from the carrier for the second uplink transmission.

Some examples of the method, apparatus, and non-transitory computer-readable medium described above may further include processes, features, means, or instructions for receiving a second grant within the second instance of the control channel, the second grant allocating second resources within the shared data channel at a time different than a time of the allocated resources, the second allocated resources and the allocated resources being on a same carrier.

Some examples of the method, apparatus, and non-transitory computer-readable medium described above may further include processes, features, means, or instructions for monitoring, by the wireless device, for a reference signal on a carrier of the plurality of carriers within a time interval that includes a first defined amount of time prior to a beginning of a scheduled transmission to the wireless device on the carrier and a second defined amount of time after an end of the scheduled transmission. Some examples of the method, apparatus, and non-transitory computer-readable medium described above may further include processes, features, means, or instructions for refraining from monitoring the carrier for the reference signal outside of the time interval.

In some examples of the method, apparatus, and non-transitory computer-readable medium described above, the time duration may be an amount of time, a number of subframes, or both.

In some examples of the method, apparatus, and non-transitory computer-readable medium described above, the time duration may be based at least in part on whether HARQ may be enabled, whether the grant may be for uplink or downlink, whether the grant may be received in a first or second instance of the control channel, whether cross-carrier scheduling may be enabled, or any combination thereof.

A method of wireless communication is described. The method may include determining a time duration relative to a control channel of when to allocate resources to a wireless device, wherein the time duration is based at least in part on which carrier of a plurality of carriers transports a shared data channel and transmitting a grant in the control channel to the wireless device identifying a timing of the allocated resources within the shared data channel, the timing of the allocated resources being based at least in part on the time duration.

An apparatus for wireless communication is described. The apparatus may include means for determining a time duration relative to a control channel of when to allocate resources to a wireless device, wherein the time duration is based at least in part on which carrier of a plurality of carriers transports a shared data channel and means for transmitting a grant in the control channel to the wireless device identifying a timing of the allocated resources within the shared data channel, the timing of the allocated resources being based at least in part on the time duration.

Another apparatus for wireless communication is described. The apparatus may include a processor, memory in electronic communication with the processor, and instructions stored in the memory. The instructions may be operable to cause the processor to determine a time duration relative to a control channel of when to allocate resources to a wireless device, wherein the time duration is based at least in part on which carrier of a plurality of carriers transports a shared data channel and transmit a grant in the control channel to the wireless device identifying a timing of the allocated resources within the shared data channel, the timing of the allocated resources being based at least in part on the time duration.

A non-transitory computer-readable medium for wireless communication is described. The non-transitory computer-readable medium may include instructions operable to cause a processor to determine a time duration relative to a control channel of when to allocate resources to a wireless device, wherein the time duration is based at least in part on which carrier of a plurality of carriers transports a shared data channel and transmit a grant in the control channel to the wireless device identifying a timing of the allocated resources within the shared data channel, the timing of the allocated resources being based at least in part on the time duration.

In some examples of the method, apparatus, and non-transitory computer-readable medium described above, the time duration includes an amount of time based at least in part on the control channel being transported on a first carrier of the plurality of carriers and the shared data channel being transported on a second carrier of the plurality of carriers, the first carrier differing from the second carrier.

In some examples of the method, apparatus, and non-transitory computer-readable medium described above, the time duration enables the wireless device to receive a second instance of the control channel prior to transmitting or receiving over the shared data channel using the allocated resources.

In some examples of the method, apparatus, and non-transitory computer-readable medium described above, the time duration includes an amount of time between the second instance of the control channel and a beginning of the allocated resources.

Some examples of the method, apparatus, and non-transitory computer-readable medium described above may further include processes, features, means, or instructions for transmitting a second grant within the second instance of the control channel, the second grant allocating second resources within the shared data channel at a time different than a time of the allocated resources.

Some examples of the method, apparatus, and non-transitory computer-readable medium described above may further include processes, features, means, or instructions for identifying an amount of time prior to a beginning of a scheduled transmission to the wireless device on a carrier of the plurality of carriers and after an ending of the scheduled transmission to the wireless device on the carrier. Some examples of the method, apparatus, and non-transitory computer-readable medium described above may further include processes, features, means, or instructions for transmitting a reference signal one or more times on the carrier within the identified amount of time. Some examples of the method, apparatus, and non-transitory computer-readable medium described above may further include processes, features, means, or instructions for determining that no additional transmissions may have been scheduled on the carrier prior to and after the identified amount of time. Some examples of the method, apparatus, and non-transitory computer-readable medium described above may further include processes, features, means, or instructions for refraining from transmitting the reference signal on the carrier outside of the identified amount of time.

In some examples of the method, apparatus, and non-transitory computer-readable medium described above, the grant includes the time duration.

Some examples of the method, apparatus, and non-transitory computer-readable medium described above may further include processes, features, means, or instructions for signaling the time duration to the wireless device during a connection setup, a connection reconfiguration, or both.

In some examples of the method, apparatus, and non-transitory computer-readable medium described above, the grant allocates second resources within the shared data channel at a time different than a time of the allocated resources.

In some examples of the method, apparatus, and non-transitory computer-readable medium described above, the time duration may be based at least in part on whether HARQ may be enabled, whether the grant may be for uplink or downlink, whether the grant may be received in a first or second instance of the control channel, whether cross-carrier scheduling may be enabled, or any combination thereof.

A method of for wireless communication is described. The method may include monitoring, by a wireless device, a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and transmitting or receiving over the shared data channel using the allocated resources and based at least in part on the time duration.

An apparatus for wireless communication is described. The apparatus may include means for monitoring a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and means for transmitting or receiving over the shared data channel using the allocated resources and based at least in part on the time duration.

Another apparatus for wireless communication is described. The apparatus may include a processor, memory in electronic communication with the processor, and instructions stored in the memory. The instructions may be operable to cause the processor to monitor a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and transmit or receive over the shared data channel using the allocated resources and based at least in part on the time duration.

A non-transitory computer readable medium for wireless communication is described. The non-transitory computer-readable medium may include instructions operable to cause a processor to monitor a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel and transmit or receive over the shared data channel using the allocated resources and based at least in part on the time duration.

In some examples of the method, apparatus, and non-transitory computer-readable medium described above, monitoring the control channel comprises determining, based at least in part on the grant sent on a first carrier, that the shared data channel may be transported on a second carrier of the plurality of carriers, the second carrier differing from the first carrier. In some examples of the method, apparatus, and non-transitory computer-readable medium described above, the time duration includes an added amount of time and a defined amount of time based at least in part on the transmitting or receiving occurring via a second carrier that differs from the first carrier.

In some examples of the method, apparatus, and non-transitory computer-readable medium described above, monitoring the control channel comprises receiving downlink control information over the control channel, the downlink control information indicating whether the shared data channel may be transported on the first carrier. In some examples of the method, apparatus, and non-transitory computer-readable medium described above, monitoring the control channel comprises receiving downlink control information over the control channel, the downlink control information indicating a carrier of the plurality of carriers for an acknowledgment message corresponding to the allocated resources.

In some examples of the method, apparatus, and non-transitory computer-readable medium described above, the allocated resources comprise a plurality of sets of resources within the shared data channel, each set of resources being associated with a different time and different transport block. In some examples of the method, apparatus, and non-transitory computer-readable medium described above, when more than one Hybrid Automatic Repeat reQuest (HARQ) process is enabled, the time duration includes an amount of time to enable the wireless device to receive a second instance of the control channel on the first carrier or a second carrier of the plurality of carriers prior to the transmitting or receiving over the shared data channel using the allocated resources. In some examples of the method, apparatus, and non-transitory computer-readable medium described above, the time duration includes an amount of time between the second instance of the control channel and a beginning of the allocated resources.

Some examples of the method, apparatus, and non-transitory computer-readable medium described above may further include processes, features, means, or instructions for receiving a second grant within the second instance of the control channel, the second grant allocating second resources within the shared data channel at a time different than a time of the allocated resources.

Some examples of the method, apparatus, and non-transitory computer-readable medium described above may further include processes, features, means, or instructions for determining, based at least in part on the first and second carrier indices, that the allocated resources and the second allocated resources may be not allocated on a same carrier of the plurality of carriers, wherein a time gap between a timing of the allocated resources and a timing of the second allocated resources may be based at least in part on the allocated resources and the second allocated resources not being on the same carrier.

Some examples of the method, apparatus, and non-transitory computer-readable medium described above may further include processes, features, means, or instructions for determining, based at least in part on the first and second carrier indices, that a carrier of the plurality of carriers for a first uplink transmission differs from a carrier of the plurality of carriers for a second uplink transmission, wherein a time gap between a timing of the first uplink transmission and a timing of the second uplink transmission may be based at least in part on the carrier for the first uplink transmission differing from the carrier for the second uplink transmission. In some examples of the method, apparatus, and non-transitory computer-readable medium described above, the first uplink transmission may be a first uplink acknowledgment for the allocated resources and the second uplink transmission may be a second uplink acknowledgment for the second allocated resources.

Some examples of the method, apparatus, and non-transitory computer-readable medium described above may further include processes, features, means, or instructions for monitoring for a reference signal on a carrier of the plurality of carriers within a time interval that includes a first defined amount of time prior to a beginning of a scheduled transmission to the wireless device on the carrier and a second defined amount of time after an end of the scheduled transmission. Some examples of the method, apparatus, and non-transitory computer-readable medium described above may further include processes, features, means, or instructions for refraining from monitoring the carrier for the reference signal outside of the time interval. In some examples of the method, apparatus, and non-transitory computer-readable medium described above, the scheduled transmission may be a transmission to the wireless device within the allocated resources, or transmission of an acknowledgment to the wireless device, or transmission of control data to the wireless device within the control channel.

Some examples of the method, apparatus, and non-transitory computer-readable medium described above may further include processes, features, means, or instructions for determining that a scheduling gap may be not included within the allocated resources based at least in part on determining that the first carrier may be different than the carrier transporting the shared data channel.

Some examples of the method, apparatus, and non-transitory computer-readable medium described above may further include processes, features, means, or instructions for receiving control signaling during a connection establishment, a connection reconfiguration, or both, the control signaling indicating whether the carrier transporting the shared data channel includes a scheduling gap.

Some examples of the method, apparatus, and non-transitory computer-readable medium described above may further include processes, features, means, or instructions for receiving control signaling during a connection setup, a connection reconfiguration, or both, the control signaling configuring the wireless device with the time duration. In some examples of the method, apparatus, and non-transitory computer-readable medium described above, the time duration may be an amount of time, a number of subframes, or both.

In some examples of the method, apparatus, and non-transitory computer-readable medium described above, the time duration may be based at least in part on the number of Hybrid Automatic Repeat reQuest (HARQ) processes that may be enabled, whether the grant may be for uplink or downlink, whether the grant may be received in a first or second instance of the control channel, whether cross-carrier scheduling may be enabled, or any combination thereof.

A method of wireless communication is described. The method may include determining to schedule communication for a wireless device, determining a time duration relative to a control channel of when to allocate resources to the wireless device for the communication, wherein the time duration is based at least in part on which carrier of a plurality of carriers transports a shared data channel, and transmitting a grant in the control channel to the wireless device identifying a timing of the allocated resources within the shared data channel, the timing of the allocated resources being based at least in part on the time duration.

An apparatus for wireless communication is described. The apparatus may include means for determining to schedule communication for a wireless device, means for determining a time duration relative to a control channel of when to allocate resources to the wireless device for the communication, wherein the time duration is based at least in part on which carrier of a plurality of carriers transports a shared data channel, and means for transmitting a grant in the control channel to the wireless device identifying a timing of the allocated resources within the shared data channel, the timing of the allocated resources being based at least in part on the time duration.

Another apparatus for wireless communication is described. The apparatus may include a processor, memory in electronic communication with the processor, and instructions stored in the memory. The instructions may be operable to cause the processor to determine to schedule communication for a wireless device, determine a time duration relative to a control channel of when to allocate resources to the wireless device for the communication, wherein the time duration is based at least in part on which carrier of a plurality of carriers transports a shared data channel, and transmit a grant in the control channel to the wireless device identifying a timing of the allocated resources within the shared data channel, the timing of the allocated resources being based at least in part on the time duration.

A non-transitory computer readable medium for wireless communication is described. The non-transitory computer-readable medium may include instructions operable to cause a processor to determine to schedule communication for a wireless device, determine a time duration relative to a control channel of when to allocate resources to the wireless device for the communication, wherein the time duration is based at least in part on which carrier of a plurality of carriers transports a shared data channel, and transmit a grant in the control channel to the wireless device identifying a timing of the allocated resources within the shared data channel, the timing of the allocated resources being based at least in part on the time duration.

In some examples of the method, apparatus, and non-transitory computer-readable medium described above, the time duration includes an amount of time based at least in part on the control channel being transported on a first carrier of the plurality of carriers and the shared data channel being transported on a second carrier of the plurality of carriers, the first carrier differing from the second carrier.

Some examples of the method, apparatus, and non-transitory computer-readable medium described above may further include processes, features, means, or instructions for transmitting downlink control information in the control channel indicating a carrier of the plurality of carriers for an acknowledgment message corresponding to the allocated resources. In some examples of the method, apparatus, and non-transitory computer-readable medium described above, the time duration enables the wireless device to receive a second instance of the control channel prior to transmitting or receiving over the shared data channel using the allocated resources. In some examples of the method, apparatus, and non-transitory computer-readable medium described above, the time duration includes an amount of time between the second instance of the control channel and a beginning of the allocated resources.

Some examples of the method, apparatus, and non-transitory computer-readable medium described above may further include processes, features, means, or instructions for transmitting a second grant within the second instance of the control channel, the second grant allocating second resources within the shared data channel at a time different than a time of the allocated resources.

Some examples of the method, apparatus, and non-transitory computer-readable medium described above may further include processes, features, means, or instructions for determining that the allocated resources indicated in the grant and the second allocated resources indicated in the second grant may be not allocated on a same carrier of the plurality of carriers. Some examples of the method, apparatus, and non-transitory computer-readable medium described above may further include processes, features, means, or instructions for determining a time gap between a timing of the allocated resources and a timing of the second allocated resources based at least in part on the allocated resources and the second allocated resources not being on the same carrier.

Some examples of the method, apparatus, and non-transitory computer-readable medium described above may further include processes, features, means, or instructions for determining that a carrier of the plurality of carriers for a first uplink transmission differs from a carrier of the plurality of carriers for a second uplink transmission. Some examples of the method, apparatus, and non-transitory computer-readable medium described above may further include processes, features, means, or instructions for determining a time gap between a timing of the first uplink transmission and a timing of the second uplink transmission based at least in part on the carrier for the first uplink transmission differing from the carrier for the second uplink transmission. In some examples of the method, apparatus, and non-transitory computer-readable medium described above, the first uplink transmission may be a first uplink acknowledgment for the allocated resources and the second uplink transmission may be a second uplink acknowledgment for the second allocated resources.

Some examples of the method, apparatus, and non-transitory computer-readable medium described above may further include processes, features, means, or instructions for identifying an amount of time prior to a beginning of a scheduled transmission to the wireless device on a carrier of the plurality of carriers and after an ending of the scheduled transmission to the wireless device on the carrier. Some examples of the method, apparatus, and non-transitory computer-readable medium described above may further include processes, features, means, or instructions for transmitting a reference signal one or more times on the carrier within the identified amount of time. Some examples of the method, apparatus, and non-transitory computer-readable medium described above may further include processes, features, means, or instructions for determining that no additional transmissions may have been scheduled on the carrier prior to and after the identified amount of time. Some examples of the method, apparatus, and non-transitory computer-readable medium described above may further include processes, features, means, or instructions for refraining from transmitting the reference signal on the carrier outside of the identified amount of time.

In some examples of the method, apparatus, and non-transitory computer-readable medium described above, the scheduled transmission may be a transmission to the wireless device within the allocated resources, or transmission of an acknowledgment to the wireless device, or transmission of control data to the wireless device within the control channel. Some examples of the method, apparatus, and non-transitory computer-readable medium described above may further include processes, features, means, or instructions for determining not to include a scheduling gap within the allocated resources based at least in part on a carrier of the plurality of carriers transporting the control channel being different than the carrier transporting the shared data channel or based at least in part on the number of carriers configured.

Some examples of the method, apparatus, and non-transitory computer-readable medium described above may further include processes, features, means, or instructions for transmitting control signaling to the wireless device during a connection setup, a connection reconfiguration, or both, the control signaling indicating whether the carrier transporting the shared data channel includes a scheduling gap. In some examples of the method, apparatus, and non-transitory computer-readable medium described above, the grant includes the time duration.

Some examples of the method, apparatus, and non-transitory computer-readable medium described above may further include processes, features, means, or instructions for signaling the time duration to the wireless device during a connection setup, a connection reconfiguration, or both. In some examples of the method, apparatus, and non-transitory computer-readable medium described above, the control channel and the shared data channel may be transported on a same carrier of the plurality of carriers. In some examples of the method, apparatus, and non-transitory computer-readable medium described above, the control channel and the shared data channel may be transported on different carriers of the plurality of carriers.

In some examples of the method, apparatus, and non-transitory computer-readable medium described above, the time duration may be an amount of time or a number of subframes. In some examples of the method, apparatus, and non-transitory computer-readable medium described above, the grant allocates second resources within the shared data channel at a time different than a time of the allocated resources. In some examples of the method, apparatus, and non-transitory computer-readable medium described above, the time duration may be based at least in part on the number of Hybrid Automatic Repeat reQuest (HARD) processes that may be enabled, whether the grant may be for uplink or downlink, whether the grant may be received in a first or second instance of the control channel, whether cross-carrier scheduling may be enabled, or any combination thereof.

DETAILED DESCRIPTION

Figure 1:
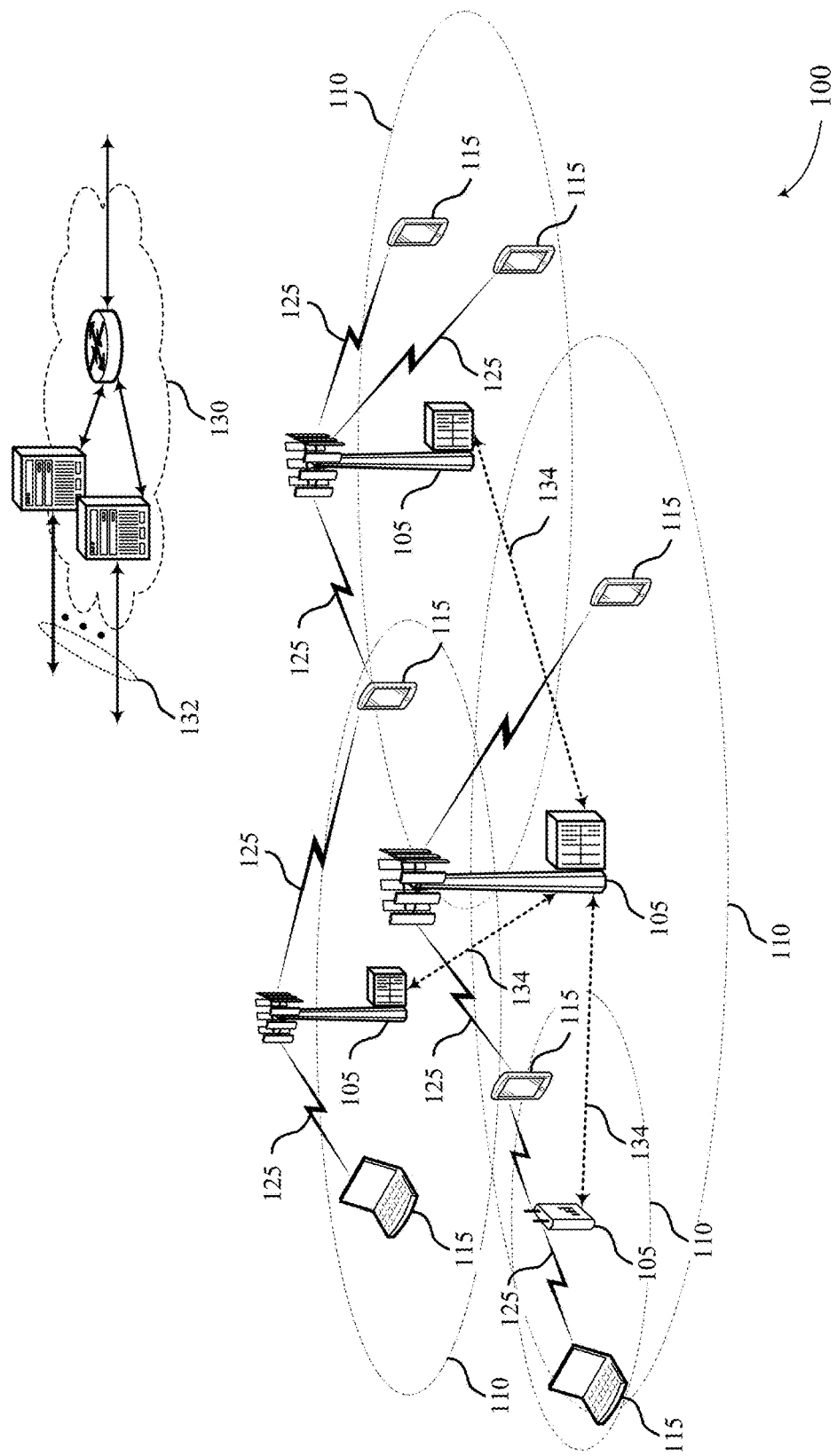
FIG. 1 illustrates an example of a system for wireless communication that supports cross-carrier scheduling for wireless devices in accordance with aspects of the present disclosure.

Techniques are disclosed for cross-carrier scheduling for wireless devices. In conventional NB-IoT systems, time and frequency resources are defined that a base station and multiple UEs may use to communicate. The base station may schedule time and frequency resources for downlink and uplink communication with the UE. The time and frequency resources may be divided into different types of channels, including a Physical Downlink Control Channel (PDCCH), a Physical Downlink Shared Channel (PDSCH), and a Physical Uplink Shared Channel (PUSCH). The PDSCH and the PUSCH may be resources shared by the UE with other UEs, and the base station may inform a particular UE of when it has been granted a portion of the PDSCH to receive downlink data and a portion of the PUSCH for sending uplink data. The base station may send control signaling to the UE in the PDCCH. The control signaling may inform the UE device to expect to receive downlink data in a certain portion of the PDSCH, that the UE may transmit to the base station during a certain portion of the PUSCH, or both.

In some cases, each of the PDCCH, PDSCH, and the PUSCH may be transported using a single carrier frequency. Scheduling latency, however, is an issue in NB-IoT systems when a single carrier is used. For instance, a base station may use the PDCCH to schedule a PDSCH transmission to the UE. In some cases, a PDSCH transmission may be sent over a long duration, thus tying up the single carrier for the long duration. Other UEs are prevented from using the single carrier during that long duration, and hence cannot be scheduled until completion of the PDSCH transmission. The same scheduling problem may occur in the uplink direction. The base station may allocate resources to the UE for a PUSCH transmission that may occupy the single carrier for an extended amount of time. Configuring multiple carriers and distributing different users to different carriers may somewhat mitigate the scheduling issue but trunking efficiency of conventional multi-carrier techniques is subpar.

To overcome these and other issues, the examples provide cross-carrier scheduling for wireless devices that improve channel utilization and trunking efficiency. Multiple carriers may be used for PDCCH, PDSCH, and PUSCH transmissions, and a time duration between scheduled uplink and downlink transmissions may be a function of whether the UE has to tune between carriers to transmit or receive using allocated resources. In an example, a UE monitors PDCCH on a first carrier for a grant that includes downlink control information (DCI) allocating resources to the UE on one of multiple carriers. The UE process the DCI to determine on which carrier of multiple carriers resources have been allocated to the UE. If on a different carrier than the PDCCH carrier, a time duration between the PDCCH transmission and a timing of the allocated resources may include an added amount of time to enable the UE to tune between carriers. Beneficially, the UE may have an adequate amount of time to receive and decode transmissions from the base station, and transmit to the base station, using different carriers thereby providing for improved channel utilization and trunking efficiency.

Aspects of the disclosure are initially described in the context of a wireless communications system. Cross-carrier scheduling for wireless devices may determine a time duration between transmissions based on whether the transmissions occur on different carriers. Aspects of the disclosure are further illustrated by and described with reference to apparatus diagrams, system diagrams, and flowcharts that relate to cross-carrier scheduling for wireless devices.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

The base station 105 may schedule a UE 115 with resources on one of multiple carriers for uplink and downlink transmissions. The base station 105 may transmit PDCCH using a first carrier and may cross-carrier schedule the UE 115 with resources on one or more different carriers. During scheduling, the base station 105 may determine a time duration between consecutive transmissions. A length of the time duration may be variable, and the base station 105 may schedule the consecutive transmissions to account for whether the UE 115 has to tune between carriers and processing capabilities of the UE 115. If not being cross-carrier scheduled, the base station 105-a may provide a defined amount of time between an end of a PDCCH transmission and a beginning of a PDSCH transmission or a PUSCH transmission. The defined amount of time may enable the UE 115 to receive and decode the PDCCH transmission prior to acting upon an instruction in the PDCCH transmission. In some instances, the UE may be a NB-IoT device having limited processing capabilities, and hence may require at least a certain amount of processing time. When the UE 115 is being cross-carrier scheduled, the base station 105 may add an additional time to the defined amount of time. The additional time may be allotted to give the UE 115 sufficient time to tune between carriers.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f$=307200$T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may include one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may include one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may include one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Conventional systems have scheduling latency issues, inefficient trunking, or both. To overcome these and other issues, the examples provided cross-carrier scheduling for wireless devices that improve channel utilization and trunking efficiency. Multiple carriers may be used for PDCCH, PDSCH, and PUSCH transmissions, and a time duration between scheduled uplink and downlink transmissions may be a function of whether the UE has to tune between carriers to transmit or receive using allocated resources.

Figure 2:
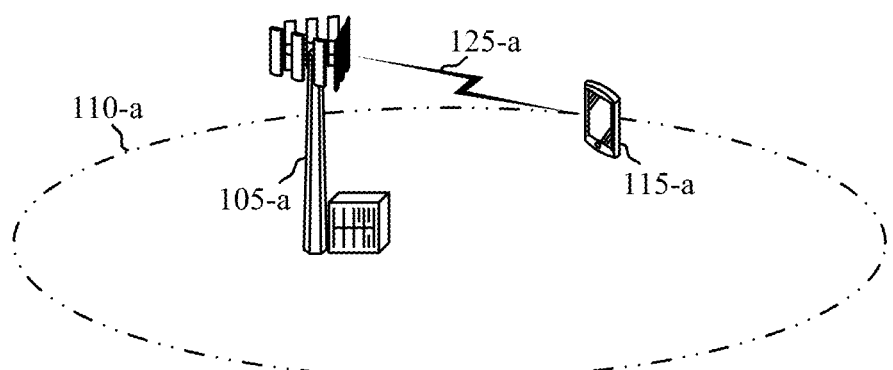
FIG. 2 illustrates an example of a wireless communications system that supports cross-carrier scheduling for wireless devices in accordance with aspects of the present disclosure.

FIG. 2 illustrates an example of a wireless communications system 200 that supports cross-carrier scheduling for wireless devices in accordance with various aspects of the present disclosure. Wireless communications system 200 may include a base station 105-$a$ having a coverage area 110-$a$, and a UE 115-$a$ within the coverage area 110-$a$. UE 115-$a$ may communicate with base station 105-$a$ via communication link 125-$a$. Base station 105-$a$ is an example of base station 105, and UE 115-$a$ is an example of UE 115 of FIG. 1. Other UEs (not shown) may be included in the coverage area 110-$a$ and may also communicate with base station 105-$a$ via a communication link.

Base station 105-$a$ may implement narrowband internet of things (NB-IoT) technology that provides multiple carriers for communicating with one or more UEs 115-$a$. In some cases, base station 105-$a$ may provide two types of downlink (DL) carriers for communicating to the UE 115-$a$: a PDCCH carrier and a PDSCH carrier. The notion of a carrier being a PDCCH carrier or a PDSCH carrier may be specific to a particular UE 115, base station 105, cell operated by the base station 105, or any combination thereof. The PDCCH carrier may transport PDCCH transmissions and optionally may also transport a PDSCH for the UE 115-$a$. In an example, the base station 105-$a$ may periodically transmit PDCCH transmissions using the PDCCH carrier at regular, irregular, and/or semi-regular times. The PDCCH transmissions may include instructions to all UEs 115 connected to the base station 105-$a$, and may include UE-specific instruction for instructing and scheduling UEs on a UE by UE basis.

The PDCCH carrier may be referred to as an anchor carrier, a non-anchor carrier, or both, in an NB-IoT system. The PDSCH carrier may transport PDSCH transmissions for the UE 115-*a*. A PDSCH transmission may be downlink (DL) data being sent to the UE 115-*a*. In some instances, the PDSCH carrier may not transport the PDCCH. The base station 105-*a* may use the PDCCH transported on the PDCCH carrier to schedule PDSCH transmissions to the UE 115-*a* on the PDSCH carrier. Using a first carrier to schedule communication on a second, different, carrier may be referred to herein as cross-carrier scheduling. In some cases, a PDSCH carrier may also transport PDCCH transmissions for other UEs, and the UE 115-*a* may skip monitoring for PDCCH on the PDSCH carrier.

The base station 105-*a* may provide information to enable UEs 115 to identify one or more PDCCH carriers and one or more PUCCH carriers. In an example, the base station 105-*a* may transmit a system information block (SIB) that indicates which one or more carriers transport PDCCH, which one or more carriers transport PDSCH, or both. In another example, when a connection is being established, the base station 105-*a* may use control signaling (e.g., radio resource control (RRC) signaling) to indicate which one or more carriers transport PDCCH, which one or more carriers transport PDSCH, or both. In some examples, the SIB may indicate that a carrier is both a PDCCH carrier and a PDSCH carrier. Such carriers may transport both PDCCH transmission and PDSCH transmissions.

In the uplink, there may be three types of carriers: acknowledgment (ACK) carriers, PUSCH carriers, and anchor uplink (UL) carriers. In some examples, the ACK carriers, PUSCH carriers, and anchor UL carriers may correspond to the same or different frequencies as the PDCCH and PUSCH carriers. An ACK carrier may be the carrier defined for transporting ACK messages from the UE 115-*a* to the base station 105-*a*. An ACK message may indicate whether a transmission from the base station 105-*a* was successfully received by the UE 115-*a*. A PUSCH carrier be the carrier defined for transporting UL data from the UE 115-*a* to the base station 105-*a*. An anchor DL carrier may transmit synchronization signals and broadcast information. An anchor UL carrier may transport ACK messages, UL data, Uplink Control Information (UCI), periodic channel quality indicator (CQI) data, PRACH, and/or the like, from the UE 115-*a* to the base station 105-*a*. The periodic CQI may include measurements, by UE 115-*a*, of a communication channel associated with one or more carriers. Control signaling and/or SIB may be used to identify which ACK carriers, PUSCH carriers, and anchor UL carriers are used for specific transmissions. For example, the PDCCH carrying a DL grant may also indicate the carrier to be used for the corresponding ACK sent in the UL. In some examples, a single UL carrier may be one or more of an ACK carrier, a PUSCH carrier, and an anchor UL carrier.

Different types of information may transmitted on different UL carriers depending on whether one or more UL carriers are available. In some examples, one UL carrier may be used for regular data transmissions, and a different UL carrier be used for periodic transmissions (e.g., sending a scheduling Request (SR), uplink control information ((UCI), and/or the like). The UE 115-*a* may use a UL carrier to send a sounding reference signal (SRS) to the base station 105-*a*. The SRS may be a reference signal transmitted by the UE 115-*a* in the uplink direction which is used by the base station 105-*a* to estimate uplink channel quality. For aperiodic SRS, a trigger grant may identify a carrier (e.g., an NB-IoT carrier) in which the trigger grant is transmitted.

In an example, the UE 115-*a* may be configured to use two UL carriers when communicating with base station 105-*a*. A first UL carrier may be a default carrier used by the UE 115-*a* for transmission of ACK messages, UL data, periodic CQI data, and/or the like. The UE 115-*a* may use the second UL carrier, instead of or additional to, the first UL carrier, when instructed in the PDCCH (e.g., downlink control information (DCI) in PDCCH instructs UE 115-*a* to use second anchor UL carrier).

In some instances, the base station 105-*a* may not support a separate anchor UL carrier in a carrier set that includes one or more UL ACK carriers, one or more PUSCH carriers, or any combination thereof. The one or more UL ACK carriers, one or more PUSCH carriers, or any combination thereof, may carry synchronization signals, broadcast information ACK messages, UL data, periodic channel quality indicator (CQI) data, and/or the like, instead of having a separate anchor UL carrier. Likewise, in the downlink, the base station 105-*a* may not support a separate anchor UL carrier in a carrier set that includes one or more PDSCH carriers.

In some examples, the base station 105-*a* and UE 115-*a* may communicate using narrowband internet of things (NB-IoT) technology. NB-IoT technology may a frequency band of having a defined bandwidth (e.g., 180 kHz bandwidth), and may correspond to one resource block in LTE transmission. NB-IoT technology supports three modes of operation: stand-alone operation, guard band operation, and in-band operation. In stand-alone operation, frequencies are defined in which the base station 105-*a* and UE 115-*a* may communicate. In guard band operation, the base station 105-*a* and UE 115-*a* may communicate using unused resource blocks within a guard-band of a cellular carrier (e.g., LTE carrier). In in-band operation, the base station 105-*a* and UE 115-*a* may communicate using resource blocks within a cellular carrier (e.g., an LTE carrier). The examples provided herein may be used in any of these modes. For standalone and in-band modes, frequency offsets, time offsets, or both may be used when cross-carrier scheduling the UE 115-*a*.

Figure 3:
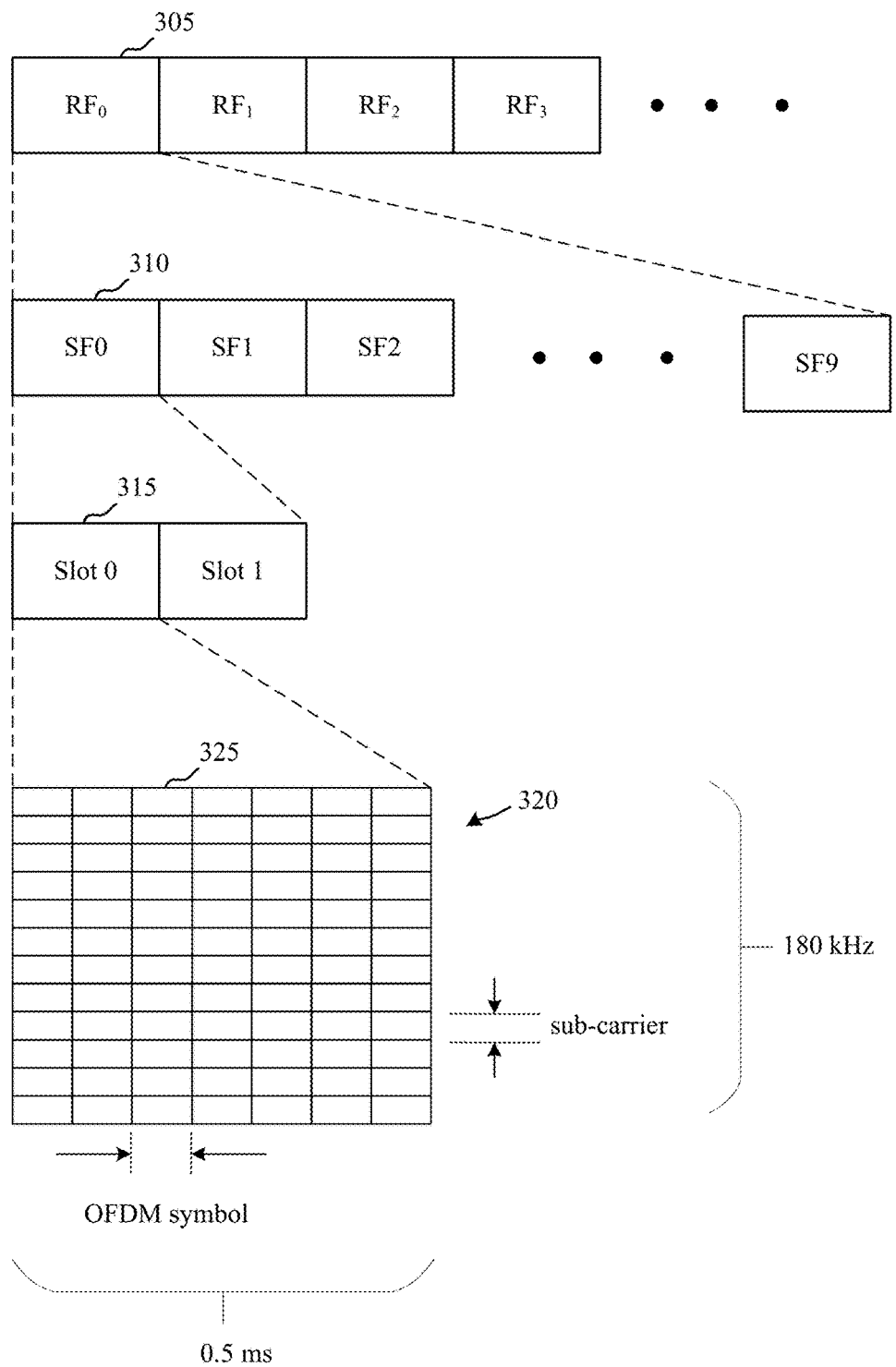
FIG. 3 illustrates an example diagram of radio frames that support cross-carrier scheduling for wireless devices in accordance with aspects of the present disclosure.

The base station 105-*a* may schedule time and frequency resources for uplink and downlink communication with the UE 115-*a*. FIG. 3 illustrates an example diagram 300 of radio frames that supports cross-carrier scheduling for wireless devices in accordance with various aspects of the present disclosure. In an example, the base station 105-*a* may allocate 1024 cyclically repeated radio frames 305, each of having a defined duration (e.g., 10 ms) and transported on a particular carrier. A radio frame 305 may be partitioned into 10 subframes 310, each composed of multiple slots 315 (e.g., Slot 0, Slot 1). A subframe 310 may have a configuration that corresponding to its type. An uplink subframe transports UL data from the UE 115-*a* to the base station 105-*a*, and a downlink subframe transports DL data from the base station 105-*a* to the UE 115-*a*. A slot 315 may transport a resource block 320. In the DL, OFDM may be applied using a 15 kHz subcarrier spacing with normal cyclic prefix (CP). Each OFDM symbol may include 12 subcarriers of the carrier that occupy a bandwidth of 180 kHz. Seven OFDMA symbols are bundled into one slot 315. A resource element 325 is defined as one subcarrier in one OFDMA symbol. A base station 105-*a* may operate multiple carriers, such as one or more PDCCH carriers, one or more PDSCH carriers, one or more ACK carriers, one or more PUSCH carriers, and one or more anchor UL carriers. Radio frames 305 may be communicated on each of the multiple carriers, and the base station 105-*a* may allocate resources to one or more UEs 115 on the multiple carriers.

In an example, the base station 105-a may define a set of carriers per PDCCH carrier, or may configure a set of carriers on a per UE basis. The base station 105-a may transmit a SIB identifying a PDCCH carrier and a set of one or more other carriers associated with the PDCCH carrier. The other carriers may be one or more DL carriers, one or more UL carriers, or both. The SIB may, for example, identify a frequency of the PDCCH carrier and a frequency of each of the one or more other carriers in the set. In another example, the base station 105-a may use RRC signaling to configure UE 115-a with a PDCCH carrier and a set of one or more other carriers associated with the PDCCH carrier. In some examples, the UE 115-a may assume that all carriers in the set are available to be scheduled, RRC signaling may specify that the UE 115-a may be scheduled on some or all of the carriers in the set, DCI in the PDCCH may specify that the UE 115-a may be scheduled on some or all of the carriers in the set, or any combination thereof.

In an example, DCI may include one or more bits to indicate a specific DL carrier to use for PDSCH and a specific UL carrier to use for the PUSCH. In some cases, the number of carriers for UL and DL cross-carrier scheduling may be the same or different. For example, a set of carriers may include four downlink carriers (e.g., a PDCCH carrier and three PDSCH carriers) and two uplink carriers (e.g., an anchor UL carrier, an UL ACK carrier, and a PUSCH carrier). The DCI may include information on each carrier (e.g., a field in DCI indicates with carrier to use for UL and DL). A size of the DCI field may depend on the number of carriers. For example, a single bit may be used if a single carrier is available for cross-carrier scheduling, 2 bits may be used for up to four carriers, 3 bits for up to eight carriers, and so forth.

Cross-carrier scheduling may be enabled and/or disabled through RRC signaling, a PDCCH order, or the like. Additional carriers may also be enabled and/or disabled through RRC signaling, a PDCCH order, or the like. In some examples, a PDCCH transmission may include a cross-carrier indication in a UE-specific search space to indicate whether cross-carrier scheduling is enabled.

Figure 4:
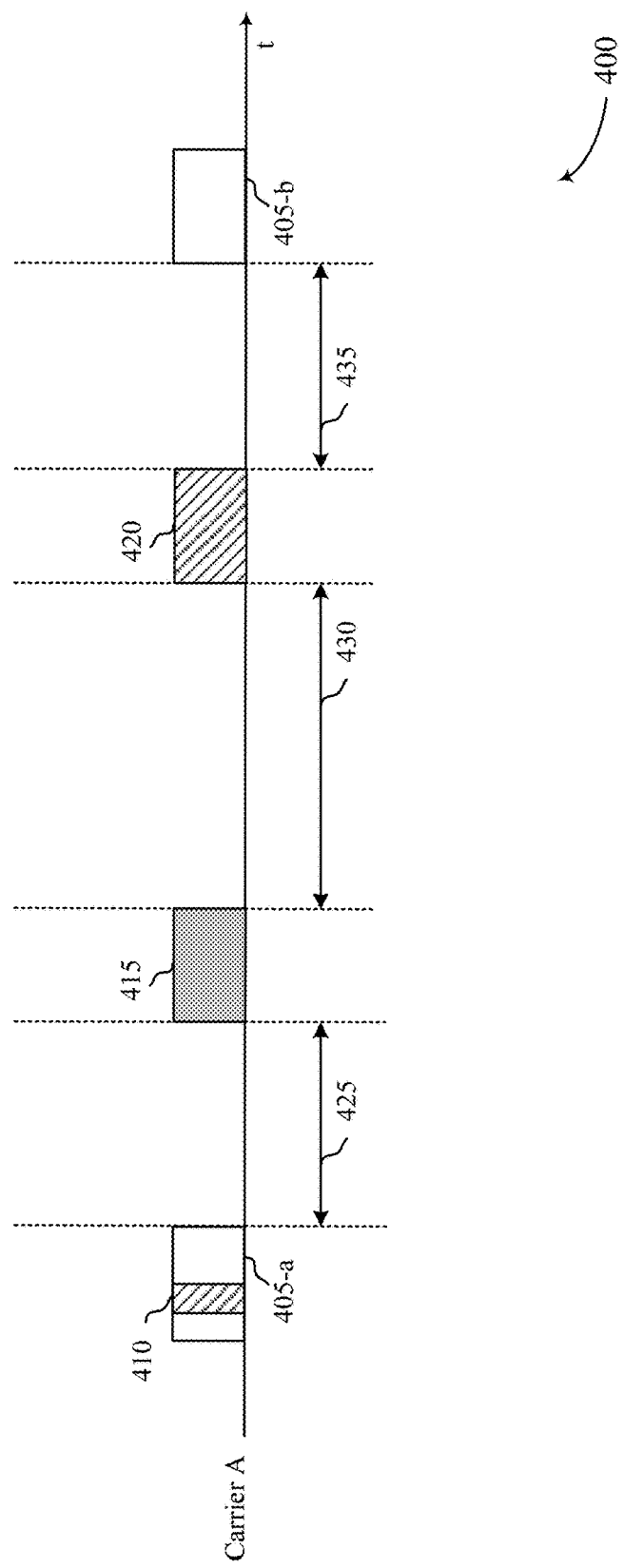
FIG. 4 illustrates an example of a timing diagram that supports cross-carrier scheduling for wireless devices in accordance with aspects of the present disclosure.

The following describes a timeline without cross-carrier scheduling, and the subsequent examples extend the principles to cross-carrier scheduling. FIG. 4 illustrates an example of a timeline 400 that supports cross-carrier scheduling for wireless devices in accordance with various aspects of the present disclosure. Initially, the base station 105-a and UE 115-a may establish a connection using known procedures, such as RRC signaling, and the base station 105-a may inform the UE 115-a of a carrier to be used for communication. The timeline 400 is depicted for the base station 105-a and UE 115-a communicating using a single carrier (e.g., Carrier A). A base station 105-a may periodically transmit PDCCH transmissions 405, and the UE 115-a may monitor the PDCCH transmissions to determine whether uplink resources, downlink resources, or both, have been allocated to the UE 115-a. In an example, UE 115-a may monitor for a PDCCH transmission 405-a and may receive a grant 410. Grant 410 may include a carrier index to identify on which carrier resources have been allocated to the UE 115-a, and a timing of sets of one or more allocated resources (e.g., identify a slot, transport block, resource block, subframe, frame, and/or the like). The sets of resources may identify one or more of PDSCH resources, PDCCH resources, PUSCH resources, ACK resources, and/or any combination thereof, a timing of each of the resources, and a carrier for each of the resources. Each set of resources may be associated with a different time and different transport block. A transport block may identify a particular resource block, slot, subframe, radio frame, or any combination thereof. The timing may also specify a periodicity of the allocated set of resources for allocating multiple instances of the set of resources over time. Grant 410 is depicted as only a portion of the PDCCH transmission 405-a as the PDCCH transmission 405-a may include grants for other UEs. The grant 410 may include, for example, DCI. The grant 410 may allocate PDSCH resources 415 on carrier A and ACK resources 420 on Carrier B to the UE 115-a. The allocated PDSCH resources 415 on Carrier A may include one or more resource blocks 320, one or more slots 315, one or more subframes 310, one or more radio frames 305 on carrier A. The UE 115-a may decode a PDSCH transmission within the allocated PDSCH resources 415 and may transmit an ACK in allocated ACK resources 420 indicating whether the UE 115-a was able to successfully decode the PDSCH resources 415. The UE 115-a may monitor the Carrier A for a subsequent PDCCH 405-a.

Between PDCCH 405-a and PDSCH 415 is a first time duration 425 (e.g., 4 ms), between PDSCH 415 and ACK 420 is a second time duration 430 (e.g. 12 ms), and between ACK 420 and the subsequent PDCCH 405-b is a third time duration 435 (e.g., 4 ms). The length of each of the time durations 425, 430, and 435, as well as the other time durations and time gaps discussed herein, may be measured in time (e.g., milliseconds, valid subframes, NRS subframes, etc.), resource blocks, time slots, subframes, frames, or the like. The time duration may be a function of whether HARQ is enabled and of whether the PDCCH includes a DL grant or a UL grant. The base station 105-a may schedule other UEs within the time durations and time gaps described herein, but those transmissions are not depicted in FIG. 4 and in the subsequent figures. The timeline 400 may be similar in the uplink direction, but with the grant 410 allocating PUSCH resources to the UE 115-a on Carrier A at 415 for a PUSCH transmission, and the base station 105-a sending an ACK to the UE 115-a in ACK resources 420.

In some cases, the UE 115-a may be an IoT device that has comparatively low processing power and hence may require a defined amount of time (e.g., one or more subframes) to decode and process PDCCH and/or PDSCH transmissions. The amount of time of each of the time durations 425, 430, and 435 may provide the UE 115-a with sufficient time to decode and process PDCCH 405 and/or PDSCH 415. In some examples, the UE 115-a may only be able to transmit or receive using a single carrier at a time, and cross-carrier scheduling may require the UE 115-a to tune to a different carrier. The examples described herein may dynamically adjust one or more time durations between transmissions to account for whether cross-carrier scheduling is enabled and whether HARQ is enabled.

Figure 5:
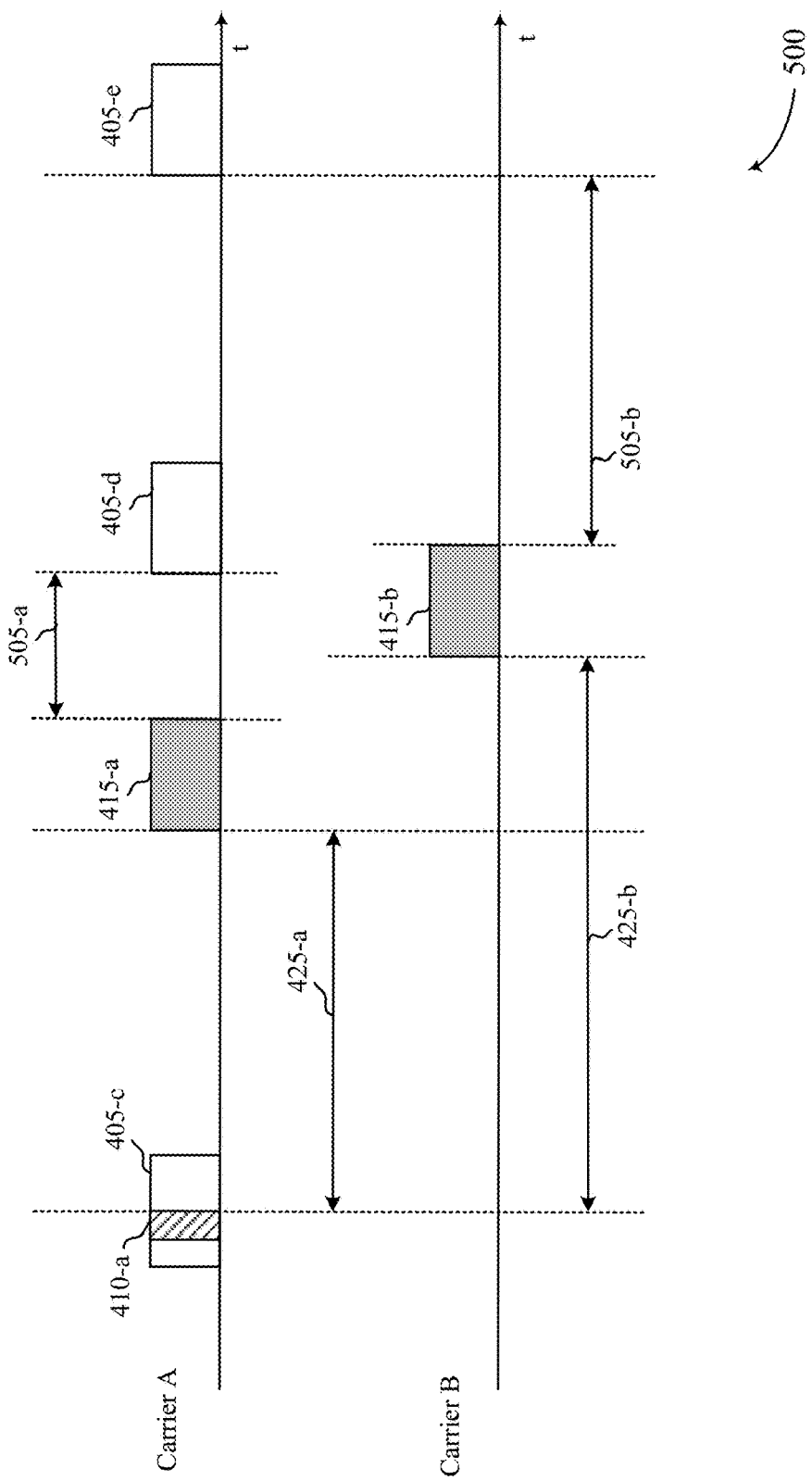
FIG. 5 illustrates an example of a timing diagram that supports cross-carrier scheduling for wireless devices in accordance with aspects of the present disclosure.

FIG. 5 illustrates an example of a timeline 500 that supports cross-carrier scheduling for wireless devices in accordance with various aspects of the present disclosure. The timeline 500 is depicted for the base station 105-a and UE 115-a communicating using Carriers A and B. Carrier A is a PDCCH carrier that may transport PDCCH and PDSCH transmissions. Carrier B is a PDSCH carrier that may transport PDSCH. In this example, cross-carrier scheduling is enabled and only a single HARQ process is enabled (or available). The UE 115-a may monitor Carrier A for a grant 410-a in the PDCCH 405-c.

A time duration 425 between grant 410-a (or an end of PDCCH 405-c) and a beginning of PDSCH 415 may depend on which carrier transports the PDSCH 415. The time duration 425-a between grant 410-a and PDSCH 415-a on Carrier A may be shorter than time duration 425-*b* between grant 410-*a* and PDSCH 415-*b* on Carrier B. The longer time duration 425-*b* may permit the UE 115-*a* to decode and process the grant 410-*a* on carrier A, and then tune to Carrier B in time to receive the PDSCH 415-*b* on Carrier B. For example, the base station 105-*a* may add a defined amount of time, resource blocks, slots, subframes, or radio frames between a PDCCH transmission and a PDSCH transmission when the PDCCH carrier differs from the PDSCH carrier. In some cases, a length of time duration 425-*a* between a grant 410-*a* and PDSCH 415-*a* on Carrier A may also be extended when cross-carrier scheduling is enabled to allow the UE 115-*a* to process the grant 410-*a* for determining whether the UE 115-*a* is to remain on Carrier A or tune to a different carrier (e.g., Carrier B). In some other examples, the length of time duration 425-*a* may be the same as the length of time duration 425-*a*, regardless of whether cross-carrier scheduling is enabled. For example, during connection set-up, the UE 115-*a* may signal its capability information to the base station 105-*a*. The capability information may specify the processing and decoding capabilities of the UE 115-*a*. The base station 105-*a* may, for example, process the capability information to determine that the UE 115-*a* does not require additional time to tune to a different carrier.

The length of time duration 425-*a*, time duration 425-*b*, or both, may be semi-statically configurable or dynamically configurable. In an example, the base station 105-*a* may semi-statically configure the UE 115-*a* with the length of time duration 425-*a*, time duration 425-*b*, or both. The base station 105-*a* may semi-statically configure the UE 115-*a* based on, for example, the capability information of the UE 115-*a*. The base station 105-*a* may signal the length of time duration 425-*a*, time duration 425-*b*, or both, in RRC signaling (e.g., during connection setup, connection reconfiguration, or the like), in system information (e.g., in a SIB), and/or the like. In another example, the base station 105-*a* may dynamically configure the UE 115-*a* with the length of time duration 425-*a*, time duration 425-*b*, or both. For example, the base station 105-*a* may generate a grant 410 that indicates the length of time duration 425-*a*, time duration 425-*b*, or both, in DCI. A set of delays may also be fixed and/or RRC signaled (e.g., during connection setup, connection reconfiguration, or the like). For example, the base station 105-*a* may signal a time duration between different types of consecutive transmissions on a same carrier and on different carriers. For example, a time duration between PDCCH and PDSCH on a same carrier may be 4 ms, and a time duration between PDCCH and PDSCH on different carriers may be 6 ms.

In some cases, the length of time duration 425-*b* may be a function of a subframe configuration of the PDSCH carrier (e.g., Carrier B). For example, the length of time duration 425-*b* may be specified as minimum of a defined amount of time or a defined number of valid subframes of the PDSCH carrier (e.g., min(X ms, Y valid subframes of the PDSCH carrier)). For full duplex UEs, a length of time duration 425-*a*, time duration 425-*b*, or both, between PDCCH and PDSCH transmissions may be increased in a similar manner and may depend on whether PDCCH 405 and PDSCH 415 are on the same carrier.

With reference also to FIG. 3, the base station 105-*a* may specify a configuration for subframes 310 on each carrier, and a subframe having the specified configuration is considered valid. A subframe having a configuration other than the specified configuration is considered invalid. In one example, for a DL carrier to have a valid subframe configuration, some or all cross-carrier scheduled carriers having a subframe configuration that is the same as a subframe configuration of an associated PDCCH carrier are considered valid subframes. In a second example, for a DL carrier to have a valid subframe configuration, some or all cross-carrier scheduled carriers have a same subframe configuration, which may be the same or differ from a subframe configuration of an associated PDCCH carrier. In an example, for an UL to have a valid subframe configuration, some or all cross-carrier scheduled carriers having a same subframe configuration as a subframe configuration of an associated UL "anchor carrier" are considered valid. In another example, for an UL to have a valid subframe configuration, some or all cross-carrier scheduled carriers have a same subframe configuration, which may be the same or differ from an associated anchor UL carrier.

In some cases, a time duration 505 between an end of PDSCH 415 and a beginning of a subsequent PDCCH 405 may be variable and depend on which carrier transports the PDSCH 415. With continued reference to FIG. 5, the time duration 505-*a* between PDSCH 415-*a* and PDCCH 405-*d* on Carrier A may be shorter than time duration 505-*b* between PDSCH 415-*b* on Carrier B and PDCCH 405-*e* on Carrier A. The longer time duration 505-*b* may permit the UE 115-*a* to decode and process the PDSCH 415-*b* on Carrier B, and then tune to Carrier A in time to receive the PDCCH 405-*e* on Carrier A. The base station 105-*a* may transmit each of PDCCH 405-*d* and 405-*e*, but may not include a grant 410 for UE 115-*a* in PDCCH 405-*d* because the UE 115-*a* would be unable to tune to Carrier A in time to receive the PDCCH transmission.

In some examples, the length of time duration 505-*a* may be the same as the length of time duration 505-*a*, regardless of whether cross-carrier scheduling is enabled. For example, during connection set-up (or reconfiguration), the UE 115-*a* may signal its capability information to the base station 105-*a*. The capability information may specify the processing and decoding capabilities of the UE 115-*a*. The base station 105-*a* may, for example, process the capability information to determine whether the UE 115-*a* requires additional time to tune to a different carrier, as compared to when the UE 115-*a* is not required to tune between carriers. If additional time is required, the base station 105-*a* may add an additional time to the time durations between scheduled communications (e.g., between a PDCCH transmission on a first carrier and a PDSCH transmission on a different carrier) described herein to give the UE 115-*a* sufficient time for tuning between carriers. The additional amount of time may be a defined time period (e.g., 25 additional milliseconds), a defined number of resource blocks (e.g., 5 additional resource blocks), a defined number of slots (e.g., 8 additional slots), a defined number of subframes (e.g., 3 additional subframes), a defined number of radio frames (e.g., 2 additional radio frames), any combination thereof, and/or the like.

In some examples, the UE 115-*a*, when multiple HARQ processes are enabled, may monitor multiple PDCCHs before attempting decode PDSCH. In some examples, grants in respective PDCCHs on a same carrier may schedule multiple PDSCH transmission on the same carrier, as described in FIG. 6. In other examples, grants in respective PDCCHs on different carriers may schedule multiple PDSCH transmissions on a same carrier, as described in FIG. 7. In other examples, grants in respective PDCCHs on different carriers may schedule multiple PDSCH transmissions on different carriers, as described in FIG. 8.

Figure 6:
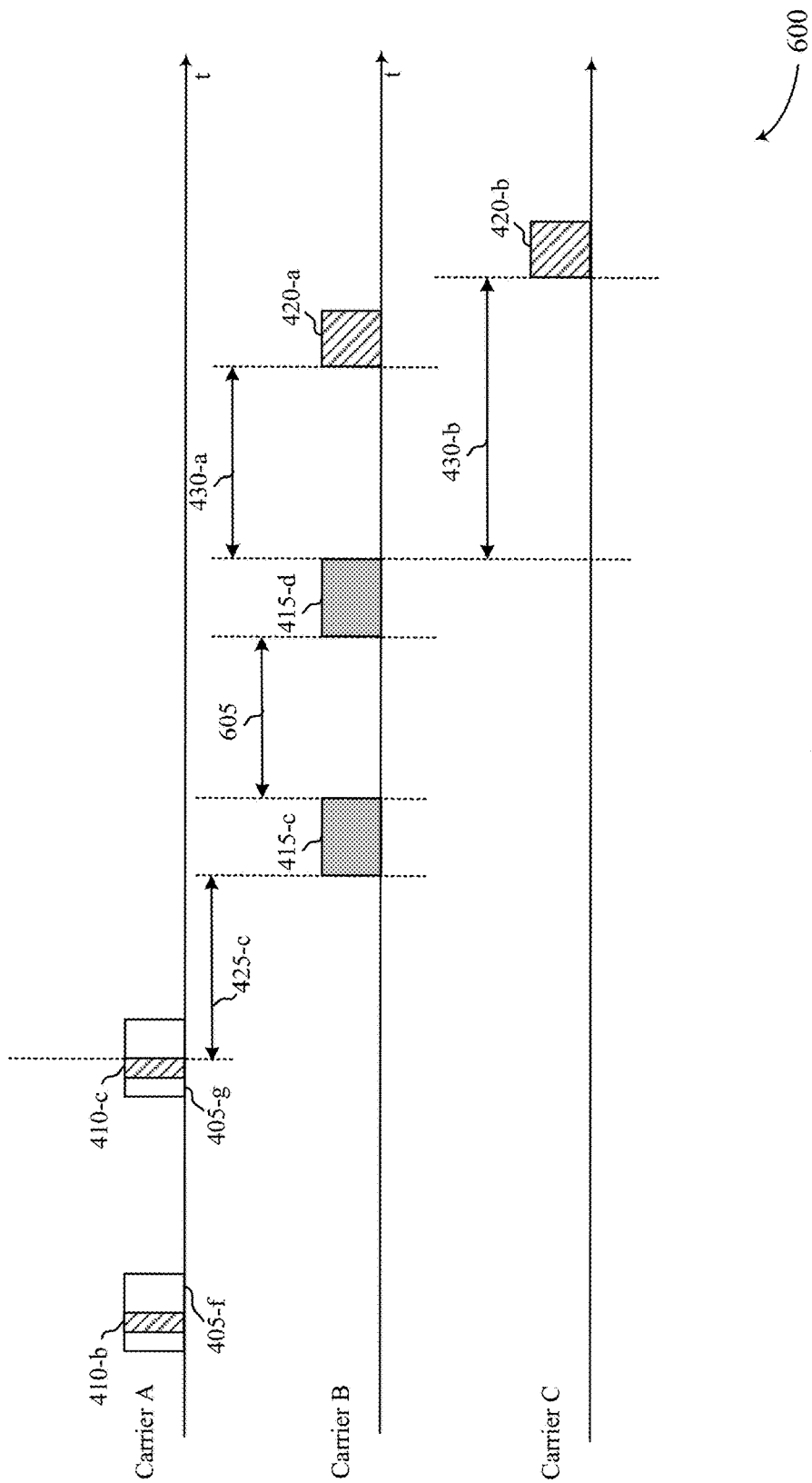
FIG. 6 illustrates an example of a timing diagram that supports cross-carrier scheduling for wireless devices in accordance with aspects of the present disclosure.

FIG. 6 illustrates an example of a downlink timeline 600 that supports cross-carrier scheduling for wireless devices in accordance with various aspects of the present disclosure. The downlink timeline 600 is depicted for the base station 105-*a* and UE 115-*a* communicating using Carriers A and B and optionally Carrier C. Carrier A is a PDCCH carrier that may transport PDCCH transmissions. Carrier B is a PDSCH carrier that may transport PDSCH and ACK transmissions. Carrier C is an ACK carrier. In this example, both cross-carrier scheduling and HARQ are enabled.

The UE 115-*a* may monitor Carrier A for a first grant 410-*b* in the PDCCH 405-*f*, and may monitor Carrier A for a second grant 410-*c* in a subsequent, second instance, of the PDCCH 405-*g*. The first grant 410-*b*, the second grant 410-*c*, or both, may schedule PDSCH transmissions by allocating PDSCH resources 415-*c*, 415-*d* to the UE 115-*a* on Carrier B. For example, the UE 115-*a* may process a carrier index of the first grant 410-*b* and a carrier index of a second grant 410-*c* to determine what PDSCH resources on Carrier B have been allocated to the UE 115-*a* (e.g., for PDSCH transmissions in allocated PDSCH resources 415-*c*, 415-*d*). Here, the carrier index of grant 410-*b* matches the carrier index of grant 410-*c*, and hence PDSCH resources 415-*c*, 415-*d* are allocated on a same carrier. A time duration 425-*c* between grant 410-*c* (or an end of PDCCH 405-*g*) and a beginning of PDSCH resources 415-*c* may permit the UE 115-*a* to tune from Carrier A to Carrier B in time to receive PDSCH resources 415-*c*. In some cases, the base station 105-*a* may provide a time gap 605 between two allocated PDSCH resources 415-*c*, 415-*d* to enable the UE 115-*a* to decode and process a first PDSCH resources 415-*c* before attempting to receive second PDSCH resources 415-*d*. A length of the time gap 605 may depend on whether the PDSCH resources 415-*c*, 415-*d* are on a same or different carrier, with time gap 605 being extended when on different carriers. A length of time gap 605 may be specified in time, resource blocks, time slots, subframes, frames, and/or the like.

In some cases, the UE 115-*a* may acknowledge whether PDSCH transmissions respectively received in allocated PDSCH resources 415-*c*, 415-*d* were successfully received. The base station 105-*a* may configure which carriers transport ACKs. In an example, the base station 105-*a* may support a separate PDCCH carrier, a separate PDSCH carrier, and a separate ACK carrier. The base station 105-*a* may identify the carriers in the SIB and/or may use RRC signaling to semi-statically configure the UE 115-*a* with the different types of carriers. For example, each DL PDSCH carrier may be associated with one or more UL ACK carriers, and the association may be fixed or dynamic. A fixed association may associate a particular DL carrier (e.g., PDSCH carrier) with at least one UL ACK carrier (e.g., one or more ACK carriers). The UE 115-*a* may send every ACK using the same at least one UL ACK carrier. In some cases, a single carrier may transport a PDSCH transmission on the downlink, and an ACK transmission on the uplink. In other cases, separate carriers may be used for PDSCH and ACK transmissions.

For a dynamic association, the base station 105-*a* may dynamically configure which UL carrier the UE 115-*a* is to use when sending an ACK. The base station 105-*a* may perform scheduling for a set of carriers, and may determine which carriers of the set one or more UEs may use for sending an ACK. In example, the base station 105-*a* may configure the UE 115-*a* with which one or more carriers in the set to use for ACK transmissions during connection setup (or reconfiguration) (e.g., using RRC signaling), and a grant 410 sent to the UE 115-*a* may be used to modify which one or more carriers in the set to use for ACK transmissions.

For instance, grant 410-*b* or 410-*c* may include DCI that identifies a DL carrier (e.g., some bits identifying a PDSCH carrier to receive a PDSCH transmission) and identifies an UL carrier (e.g., some bits identifying an ACK carrier to send ACK feedback for the PDSCH transmission). In some cases, one or more PDCCH carriers, one or more PDSCH carrier, or both, may be associated with the same UL carrier for ACK feedback, and the base station 105-*a* may schedule PDCCH transmissions, PDSCH transmissions, and ACK transmission to avoid collisions on the same UL carrier. As depicted in FIG. 5, in one example, Carrier B may transport ACKs for the UE 115-*a*, and, in another example, Carrier C may transport ACKs of the UE 115-*a* for PDSCH transmissions on Carrier B. In some cases, multiplexing methods may be defined so that ACK collisions due to DL transmissions across different DL carriers sharing the same UL carrier are still decodable by the base station 105-*a*. To do so, each carrier may be assigned a different set of orthogonal sequences, cyclic shifts, tone index, and/or the like, or any combination thereof.

The base station 105-*a* may configure the UE 115-*a* with a time duration 430 and allocate resources 420 for sending an ACK (e.g., in grant 410-*b* or 410-*c*). A length of the time duration 430 may depend on whether a carrier for the ACK transmission on the same carrier as the PDSCH resources 415-*c*, 415-*d*. Time duration 430-*a* may correspond to the ACK and PDSCH resources being on the same carrier, and time duration 430-*b* may correspond to the ACK and PDSCH resources being on different carriers. The time duration 430-*a* between PDSCH resources 415-*d* and ACK resources 420-*a* on Carrier B may be shorter than time duration 430-*b* between PDSCH resources 415-*d* and ACK resources 420-*a* on Carrier C. The longer time duration 430-*b* may permit the UE 115-*a* to decode and process the PDSCH resources 415-*d* on Carrier B, and then tune to Carrier C in time to transmit an ACK in ACK resources 420-*b* on Carrier C.

In some cases, the UE 115-*a* may send multiple ACKs to respectively acknowledge whether both PDSCH transmissions (for example corresponding to two different HARQ processes) in the allocated PDSCH resources 415-*c*, 415-*d* were successfully received. Multiple ACKs may be sent on a same carrier or on different carriers. If on a same carrier, in some examples, a time duration may be provided between allocated ACK resources which may both occur after the allocated PDSCH resources 415-*c*, 415-*d*, or may be interspersed between the allocated PDSCH resources 415-*c*, 415-*d*. If multiple ACKs are sent using ACK resources 420 on different ACK carriers, the base station 105-*a* may provide the UE 115-*a* with a time duration between an end of transmitting a first ACK on a first carrier and beginning to transmit a second ACK on a second carrier, to enable the UE 115-*a* to tune between the first carrier and the second carrier. In some cases, the UE 115-*a* may transmit the first ACK on the first carrier prior to transmitting the second ACK on the second carrier. In some cases, the carrier transporting the allocated PDSCH resources 415-*c*, 415-*d* may be the same or different than the carrier transporting the first ACK (e.g., Carrier C). If different, the base station 105-*a* may provide a time duration between the PDSCH resources 415-*c* and transmission of the first ACK in ACK resources 420-*b* to enable the UE 115-*a* to tune from the carrier of the PDSCH resources 415-*c* to Carrier C. The base station 105-*a* may configure the UE 115-*a* with a time duration between ACK resources 420 and a subsequent PDCCH 405. The time duration may permit the UE 115-*a* to transmit an ACK in ACK resources 420-*b* on Carrier C, and then tune to Carrier A in time to receive the subsequent PDCCH 405.

Figure 7:
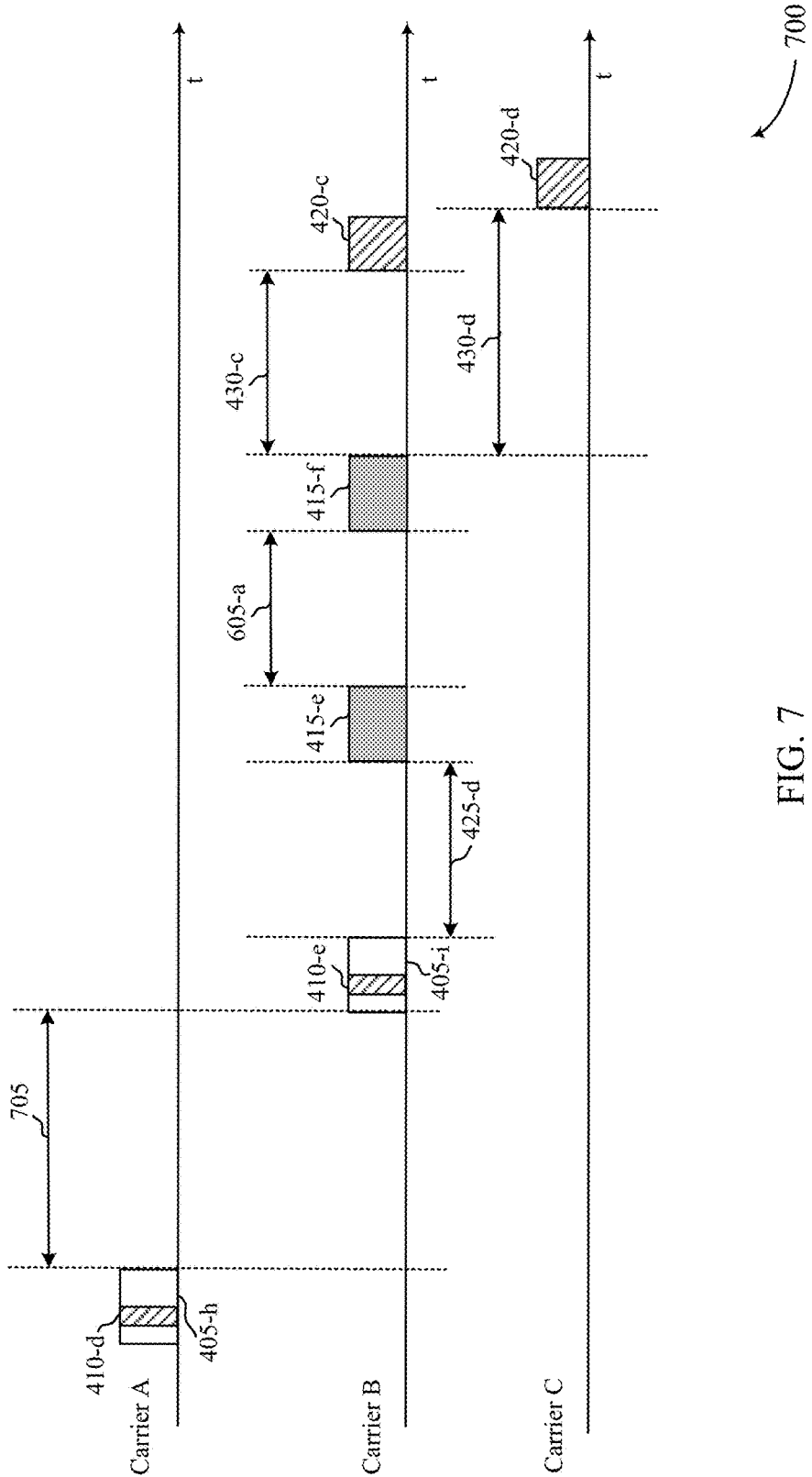
FIG. 7 illustrates an example of a timing diagram that supports cross-carrier scheduling for wireless devices in accordance with aspects of the present disclosure.

In some examples, PDCCH transmissions may be transported on different carriers. FIG. 7 illustrates an example of a timeline 700 that supports cross-carrier scheduling for wireless devices in accordance with various aspects of the present disclosure. The timeline 700 is depicted for the base station 105-*a* and UE 115-*a* communicating using Carriers A and B and optionally Carrier C. Carrier A is a first PDCCH carrier. Carrier B is a second PDCCH carrier that may transport PDCCH transmissions, PDSCH transmissions, and ACK transmissions. Carrier C is an ACK carrier. In this example, both cross-carrier scheduling and multiple HARQ processes are enabled. FIG. 7 is similar to FIG. 6, but with PDCCH transmissions being transported on different carriers.

The UE 115-*a* may monitor Carrier A for a first grant 410-*d* in the PDCCH 405-*f*, and may monitor Carrier B for a second grant 410-*e* in a subsequent PDCCH 405-*f*. In some cases, the first grant 410-*d* may grant the UE 115-*a* PDSCH resources on Carrier B, and may instruct the UE 115-*a* to look for a second PDCCH on Carrier B. A time duration 705 between grant 410-*d* (or an end of PDCCH 405-*h*) and a beginning of PDCCH transmission 405-*i* may permit the UE 115-*a* to tune from Carrier A to Carrier B in time to receive PDCCH transmission 405-*i*. The UE 115-*a* may process a carrier index of the first grant 410-*d* and a carrier index of a second grant 410-*e* to determine what PDSCH resources have been allocated to the UE 115-*a* (e.g., for PDSCH transmissions in allocated PDSCH resources 415-*e*, 415-*f*). Here, the carrier index of grant 410-*d* matches the carrier index of grant 410-*e*, and hence PDSCH resources 415-*e*, 415-*f* are allocated on a same carrier (e.g., Carrier B). A time duration 425-*d* from grant 410-*e* (or end of PDCCH 405-*i*) may permit the UE 115-*a* to attempt to receive and decode the first and second grants 410-*d*, 410-*e* prior to a beginning of a PDSCH transmissions in a first of the allocated PDSCH resources 415-*e*. The base station 105-*a* may provide a time gap 605-*a* between the two allocated PDSCH resources 415-*e*, 415-*f* to enable the UE 115-*a* to decode and process the first PDSCH transmission in resources 415-*e* before due to receive a second PDSCH transmission in second resource 415-*f*. The time gap 605-*a* may depend on whether the allocated PDSCH resources 415-*c*, 415-*d* are on a same or different carrier, with FIG. 7 depicting allocated PDSCH resources 415-*c*, 415-*d* being on a same carrier. The length of the time gap 605-*a* may be extended if allocated PDSCH resources 415-*c*, 415-*d* are on different carriers to provide the UE 115-*a* with time to tune between carriers.

Similar to the description provided above in FIG. 6, a time duration between an end of the second allocated PDSCH resources 415-*f* and ACK resources 420 allocated for transmission of a single ACK may depend on which carrier transports the ACK resources 420. Also similar to the description provided above in FIG. 6, the UE 115-*a* may send a multiple ACKs to respectively acknowledge whether both PDSCH transmissions in the allocated PDSCH resources 415-*e*, 415-*f* were successfully received.

Figure 8:
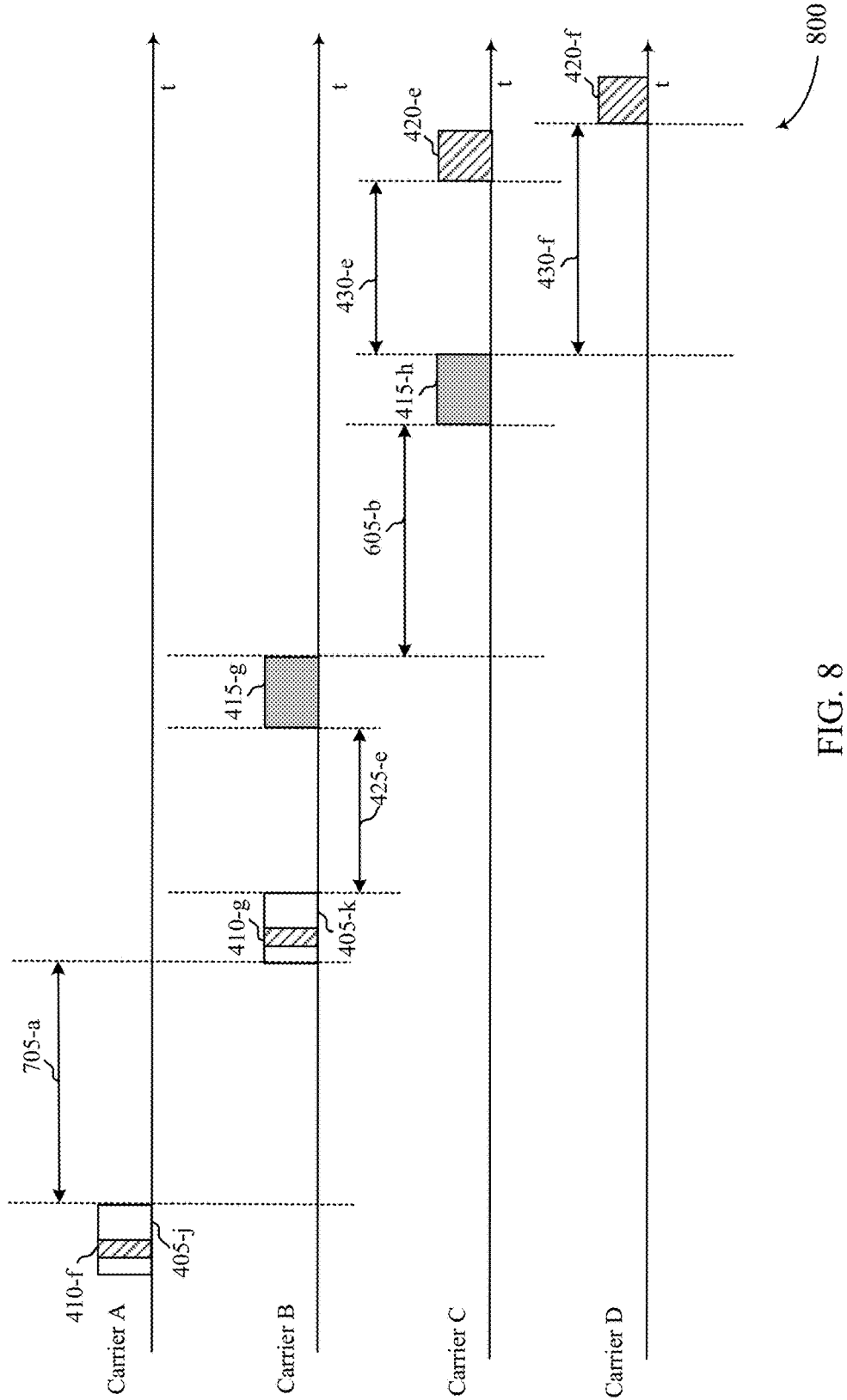
FIG. 8 illustrates an example of a timing diagram that supports cross-carrier scheduling for wireless devices in accordance with aspects of the present disclosure.

In some examples, grants in respective PDCCHs on different carriers may schedule multiple PDSCH transmissions on different carriers. FIG. 8 illustrates an example of a timeline 800 that supports cross-carrier scheduling for wireless devices in accordance with various aspects of the present disclosure. The timeline 800 is depicted for the base station 105-*a* and UE 115-*a* communicating using Carriers A, B, and C, and optionally Carrier D. Carrier A is a first PDCCH carrier. Carrier B is a second PDCCH carrier that may transport PDCCH transmissions and PDSCH transmissions. Carrier C is a PDSCH carrier that may transport PDSCH transmissions and ACK transmissions. Carrier D is an ACK carrier. In this example, both cross-carrier scheduling and multiple HARQ processes are enabled. FIG. 8 is similar to FIG. 7, but with PDCCH transmissions being transported on different carriers, and PDSCH transmissions being transported on different carriers.

The UE 115-*a* may monitor Carrier A for a first grant 410-*f* in the PDCCH 405-*j*, and may monitor Carrier B for a second grant 410-*g* in a subsequent PDCCH 405-*k*. In some cases, the first grant 410-*f* may grant the UE 115-*a* PDSCH resources 415-*g* on Carrier B, and may instruct the UE 115-*a* to look for a PDCCH on Carrier B. A time duration 705-*a* between grant 410-*f* (or an end of PDCCH 405-*j*) and a beginning of PDCCH transmission 405-*k* may permit the UE 115-*a* to tune from Carrier A to Carrier B in time to receive PDCCH transmission in allocated PDSCH resources 405-*k*. The UE 115-*a* may process a carrier index of the first grant 410-*f* and a carrier index of a second grant 410-*g* to determine what PDSCH resources have been allocated to the UE 115-*a* (e.g., for PDSCH resources 415-*g*, 415-*h*). Here, the carrier indices are different as grant 410-*f* indicates that PDSCH resources 415-*g* are allocated on carrier B, and grant 410-*g* indicates that PDSCH resources 415-*h* are allocated on carrier C. A time duration 425-*e* may permit the UE 115-*a* to attempt to receive and decode the first and second grants 410-*f*, 410-*g* prior to a beginning of a PDSCH transmission at a first allocated PDSCH resources 415-*g* on Carrier B. The base station 105-*a* may provide a time gap 605-*b* between the two PDSCH transmission in allocated PDSCH resources 415-*e* 415-*f* to enable the UE 115-*a* to decode and process the first PDSCH resources 415-*e* and tune to the Carrier C before due to process second PDSCH resources 415-*h*. The time gap 605-*b* may depend on whether the first and second PDSCH resources 415-*g*, 415-*h* are on a same or different carrier. Similar to the description provided above in FIG. 6, a time duration between an end of the second PDSCH resources 415-*h* and a beginning of ACK resources 420 for transmitting an ACK may depend on which carrier transports the ACK. Also similar to the description provided above in FIG. 6, the UE 115-*a* may send a multiple ACKs to respectively acknowledge whether both PDSCH transmissions in PDSCH resources 415-*g*, 415-*h* were successfully received.

Figure 9:
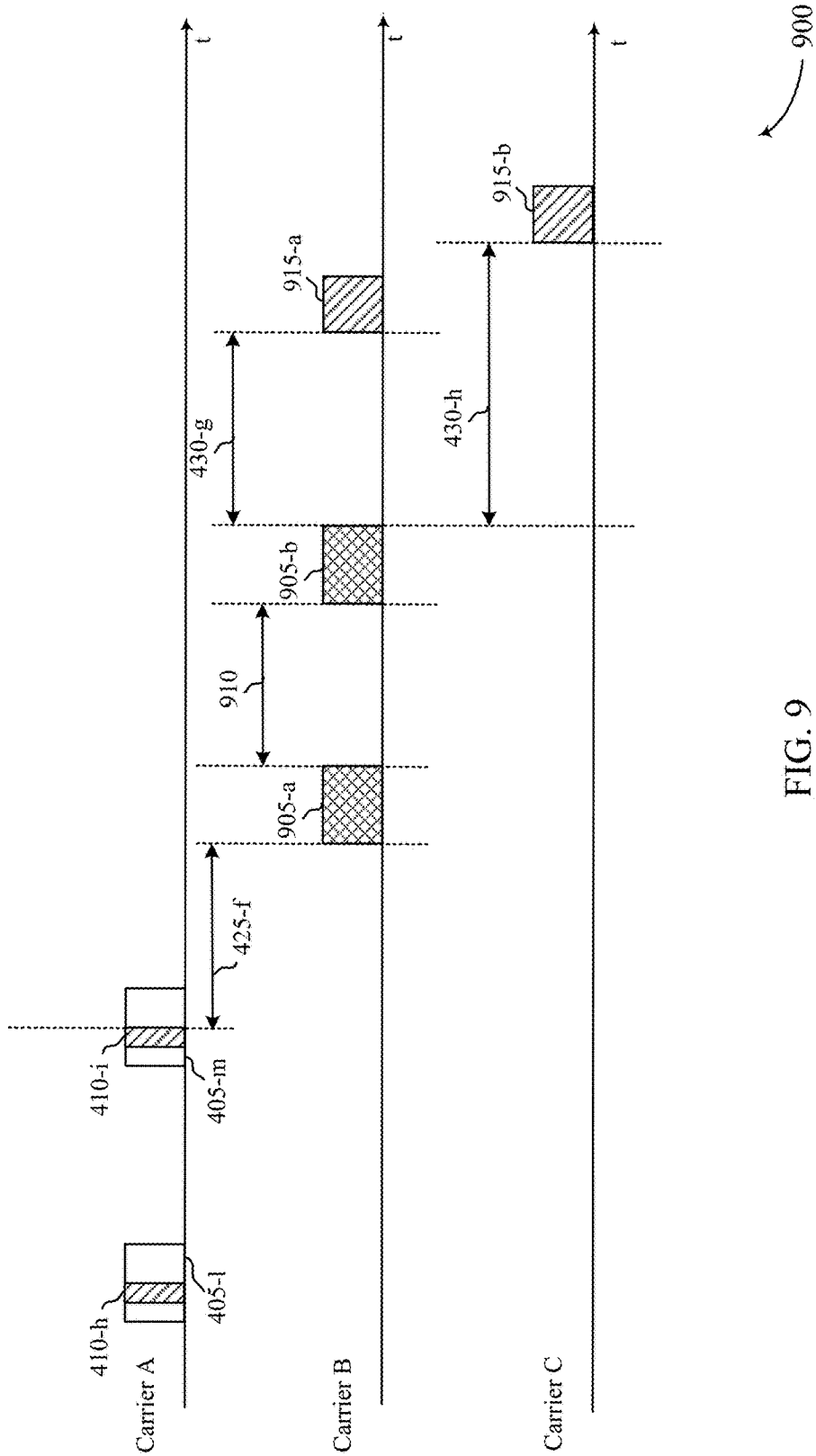
FIG. 9 illustrates an example of a timing diagram that supports cross-carrier scheduling for wireless devices in accordance with aspects of the present disclosure.

In the uplink, the base station 105-*a* may similarly adjust a length of various time durations to account for cross-carrier scheduling and HARQ enablement. FIG. 9 illustrates an example of an uplink timeline 900 that supports cross-carrier scheduling for wireless devices in accordance with various aspects of the present disclosure. The uplink timeline 900 is depicted for the base station 105-*a* and UE 115-*a* communicating using Carriers A and B and optionally Carrier C. Carrier A is a PDCCH carrier that may transport PDCCH. Carrier B is a PUSCH carrier that may transport PUSCH and ACK. Carrier C is an ACK carrier. In this example, both cross-carrier scheduling and HARQ are enabled.

The UE 115-*a* may monitor Carrier A for a first grant 410-*h* in the PDCCH 405-*f*, and may monitor Carrier A for a second grant 410-*i* in a subsequent PDCCH 405-*f*. The first grant 410-*h*, the second grant 410-*i*, or both, may schedule PUSCH transmissions by allocating PUSCH resources 905 to the UE 115-*a* on Carrier B (e.g., a carrier index of each specifies Carrier B). A time duration 425-*f* between grant 410-*i* (or an end of PDCCH 405-*m*) and a beginning of an allocated PUSCH resources 905-*a* may permit the UE 115-*a* to tune from Carrier A to Carrier B in time to transmit using the PUSCH resources 905-*a* on Carrier B. In some cases, the base station 105-*a* may provide a time gap 910 between two allocated PUSCH resources 905-*a*, 905-*b* to enable the UE 115-*a* to transmit a first PUSCH transmission using first allocated resources 905-*a* before attempting to transmit a second PUSCH transmission using second allocated resources 905-*b*. The time gap 910 may depend on whether the PUSCH resources 905-*a*, 905-*b* are on a same or different carrier.

In some cases, the UE 115-*a* may monitor for a single ACK in ACK resources 915 allocated in grant 410-*h* or 410-*i* to determine whether the base station 105-*a* successfully received both transmissions in PUSCH resources 905-*a*, 905-*b*. A time duration 430 between an end of a PUSCH transmission in allocated PUSCH resources 905 and receipt of an ACK in ACK resources 420 may depend on whether the single ACK 420-*a* is received on a same carrier as the PUSCH resources 905-*a*, 905-*b*. The time duration 430-*g* between PUSCH 905-*b* and ACK 915-*a* on Carrier B may be shorter than time duration 430-*h* between PUSCH 905-*b* and ACK 420-*a* on Carrier C. The longer time duration 430-*h* may permit the UE 115-*a* to transmit using PUSCH resources 905-*b* on Carrier B, and then tune to Carrier C in time to receive ACK in ACK resources 915-*b* on Carrier C.

In other cases, the UE 115-*a* may receive a multiple ACKs in multiple ACK resources 915 from the base station 105-*a* respectively acknowledging whether both PUSCH transmissions in allocated PUSCH resources 905-*a*, 905-*b* were successfully received. If multiple ACKs are to be received on different ACK carriers (e.g., Carrier C and Carrier R (not shown in FIG. 9), the base station 105-*a* may provide the UE 115-*a* with a time duration between an end of receiving a first ACK on a first carrier and beginning of a second ACK on a second carrier, to enable the UE 115-*a* to tune between the first carrier and the second carrier. In some cases, the UE 115-*a* may receive the first ACK on the first carrier prior to receiving the second ACK on the second carrier. In some cases, the carrier transporting the PUSCH transmission on resources 905-*a*, 905-*b* may be the same or different than the carrier transporting the first ACK. If different, the base station 105-*a* may provide a time duration between the PUSCH transmission in resources 905-*a* on one carrier and receipt of the first ACK on a different carrier to enable the UE 115-*a* to tune from the carrier of the PUSCH resources 905-*a* to the first carrier.

Figure 10:
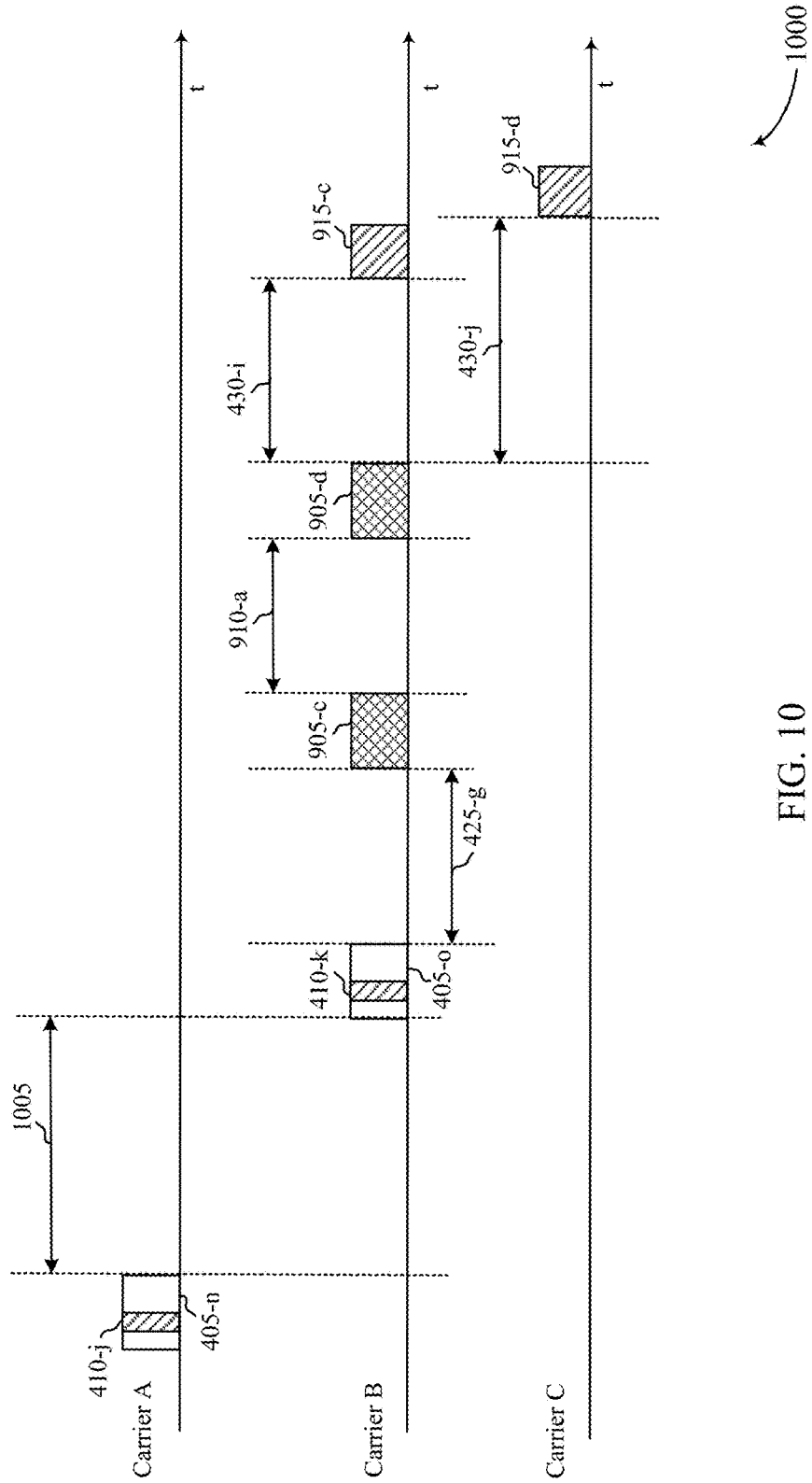
FIG. 10 illustrates an example of a timing diagram that supports cross-carrier scheduling for wireless devices in accordance with aspects of the present disclosure.

In some examples, the PDCCH transmission may be transported on different carriers. FIG. 10 illustrates an example of an uplink timeline 1000 that supports cross-carrier scheduling for wireless devices in accordance with various aspects of the present disclosure. The uplink timeline 1000 is depicted for the base station 105-*a* and UE 115-*a* communicating using Carriers A and B and optionally Carrier C. Carrier A is a first PDCCH carrier. Carrier B is a second PDCCH carrier that may transport PDCCH transmissions, PUSCH transmissions, and ACK transmissions. Carrier C is an ACK carrier. In this example, both cross-carrier scheduling and HARQ are enabled. FIG. 10 is similar to FIG. 9, but with PDCCH transmissions being transported on different carriers.

The UE 115-*a* may monitor Carrier A for a first grant 410-*j* in the PDCCH 405-*n*, and may monitor Carrier B for a second grant 410-*k* in a subsequent PDCCH 405-*o*. In some cases, the first grant 410-*j* may grant the UE 115-*a* PUSCH resources on Carrier B, and may instruct the UE 115-*a* to monitor for a PDCCH on Carrier B. A time duration 1005 between grant 410-*j* (or an end of PDCCH 405-*n*) and a beginning of PDCCH transmission 405-*o* may permit the UE 115-*a* to tune from Carrier A to Carrier B in time to receive a PDCCH transmission during PDCCH 405-*o*. The UE 115-*a* may process a carrier index of each of the first grant 410-*j* and a second grant 410-*k* to determine what PUSCH resources on Carrier B have been allocated to the UE 115-*a* (e.g., PUSCH resources 905-*c*, 905-*d*). A time duration 425-*g* may permit the UE 115-*a* to attempt to receive and decode the first and second grants 410-*j*, 410-*k* prior to a beginning of a first of the allocated PUSCH resources 905-*c*. The base station 105-*a* may provide a time gap 910-*a* between the two allocated PUSCH resources 905-*c*, 905-*d* to enable the UE 115-*a* to transmit within the first PUSCH resources 905-*c* before due to transmit with the second PUSCH resources 905-*d*. The time gap 910-*a* may depend on whether the PUSCH resources 905-*c*, 905-*d* are on a same or different carrier. Similar to the description provided above in FIG. 9, a time duration 430 between an end of the second PUSCH resources 905-*d* and ACK resources 915 may depend on which carrier transports the ACK. Also similar to the description provided above in FIG. 9, the UE 115-*a* may receive multiple ACKs in ACK resources 915 from the base station 105-*a* respectively acknowledging whether both transmissions within the PUSCH resources 905-*c*, 905-*d* were successfully received.

Figure 11:
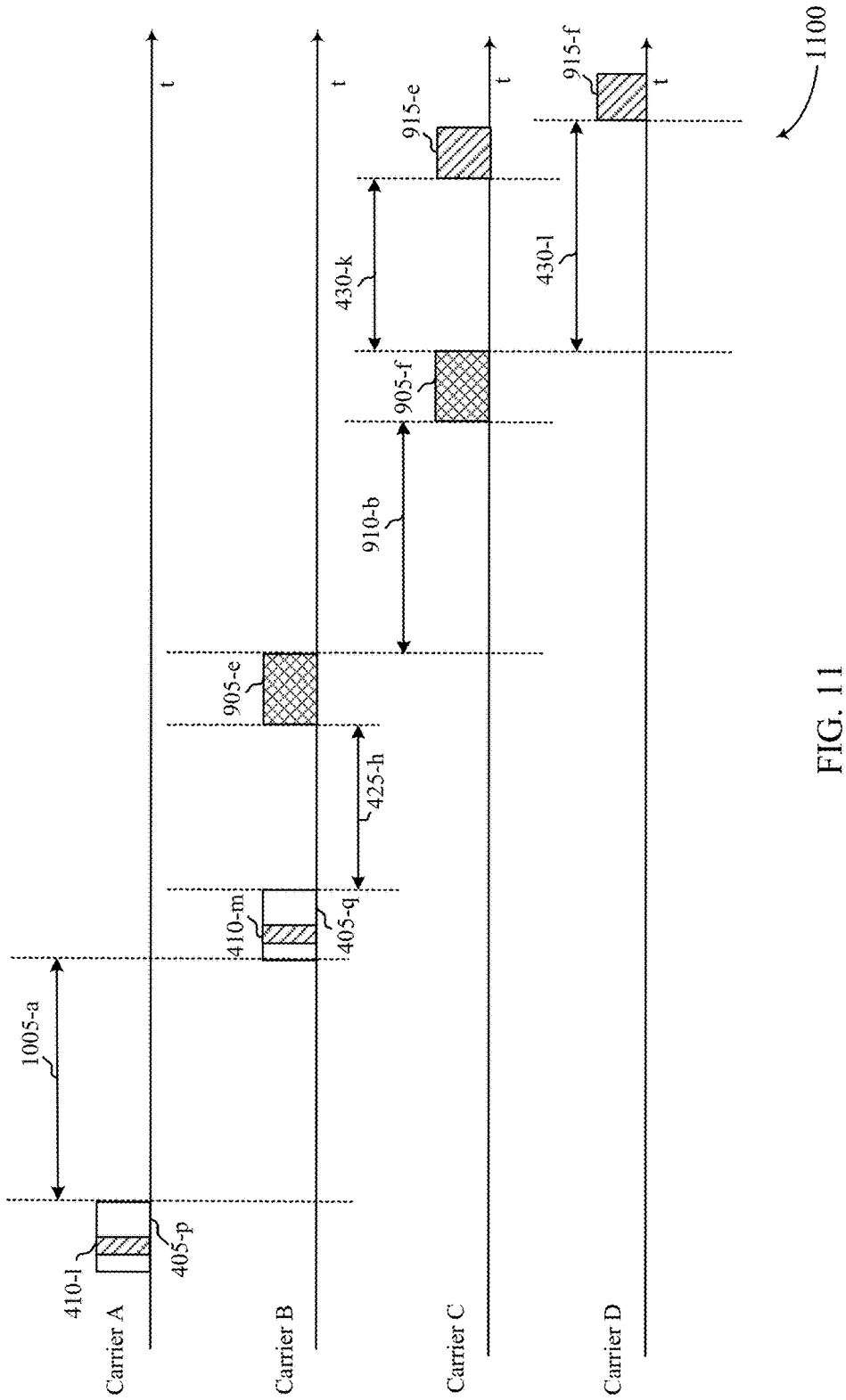
FIG. 11 illustrates an example of a timing diagram that supports cross-carrier scheduling for wireless devices in accordance with aspects of the present disclosure.

In some examples, grants in respective PDCCHs on different carriers may schedule multiple PUSCH transmissions on different carriers. FIG. 11 illustrates an example of an uplink timeline 1100 that supports cross-carrier scheduling for wireless devices in accordance with various aspects of the present disclosure. The uplink timeline 1100 is depicted for the base station 105-*a* and UE 115-*a* communicating using Carriers A, B, and C, and optionally Carrier D. Carrier A is a first PDCCH carrier. Carrier B is a second PDCCH carrier that may transport PDCCH transmissions and PUSCH transmissions. Carrier C is a PUSCH carrier that may transport PUSCH transmissions. Carrier D is an ACK carrier. In this example, both cross-carrier scheduling and HARQ are enabled. FIG. 11 is similar to FIG. 10, but with PDCCH transmissions being transported on different carriers, and PUSCH transmissions being transported on different carriers.

The UE 115-*a* may monitor Carrier A for a first grant 410-*l* in the PDCCH 405-*p*, and may monitor Carrier B for a second grant 410-*m* in a subsequent PDCCH 405-*q*. In some cases, the first grant 410-*l* may grant the UE 115-*a* PUSCH resources 905 on Carrier B, and may instruct the UE 115-*a* to look for a PDCCH on Carrier B. A time duration 1005-*a* between grant 410-*l* (or an end of PDCCH 405-*p*) and a beginning of PDCCH transmission 405-*k* may permit the UE 115-*a* to tune from Carrier A to Carrier B in time to receive PDCCH transmission 405-*q*. The UE 115-*a* may process a carrier index of each of the first grant 410-*l* and a second grant 410-*m* to determine what PUSCH resources 905 have been allocated to the UE 115-*a* (e.g., PUSCH resources 905-*e* on Carrier B, PUSCH resources 905-*f* on Carrier C). A time duration 425-*h* may permit the UE 115-*a* to attempt to receive and decode the first and second grants 410-*l*, 410-*m* prior to a beginning of a first of the PUSCH resources 905-*e* on Carrier B. The base station 105-*a* may provide a time gap 910-*b* between the two allocated PUSCH resources 905-*e*, 905-*f* to enable the UE 115-*a* to transmit using the first PUSCH resources 905-*e* and tune to the Carrier C before due to transmit using the second PUSCH resources 905-*f*. The length of the time gap 910-*b* may be a function of the allocated PUSCH resources 905-*e*, 905-*f* being on different carriers and the capabilities of the UE 115-*a*. In some cases, the length of the time gap 910-*b* may be longer than if the PUSCH resources 905-*e*, 905-*f* were on the same carrier, to account for the time to tune between carriers. Similar to the description provided above in FIG. 10, a time duration between an end of the second PUSCH resources 905-*f* and ACK resources 915 may depend on which carrier transports the ACK. Also similar to the description provided above in FIG. 10, the UE 115-*a* may send a multiple ACKs to respectively acknowledge whether transmission in each of PUSCH resources 905-*e*, 905-*f* were successfully received.

Figure 12:
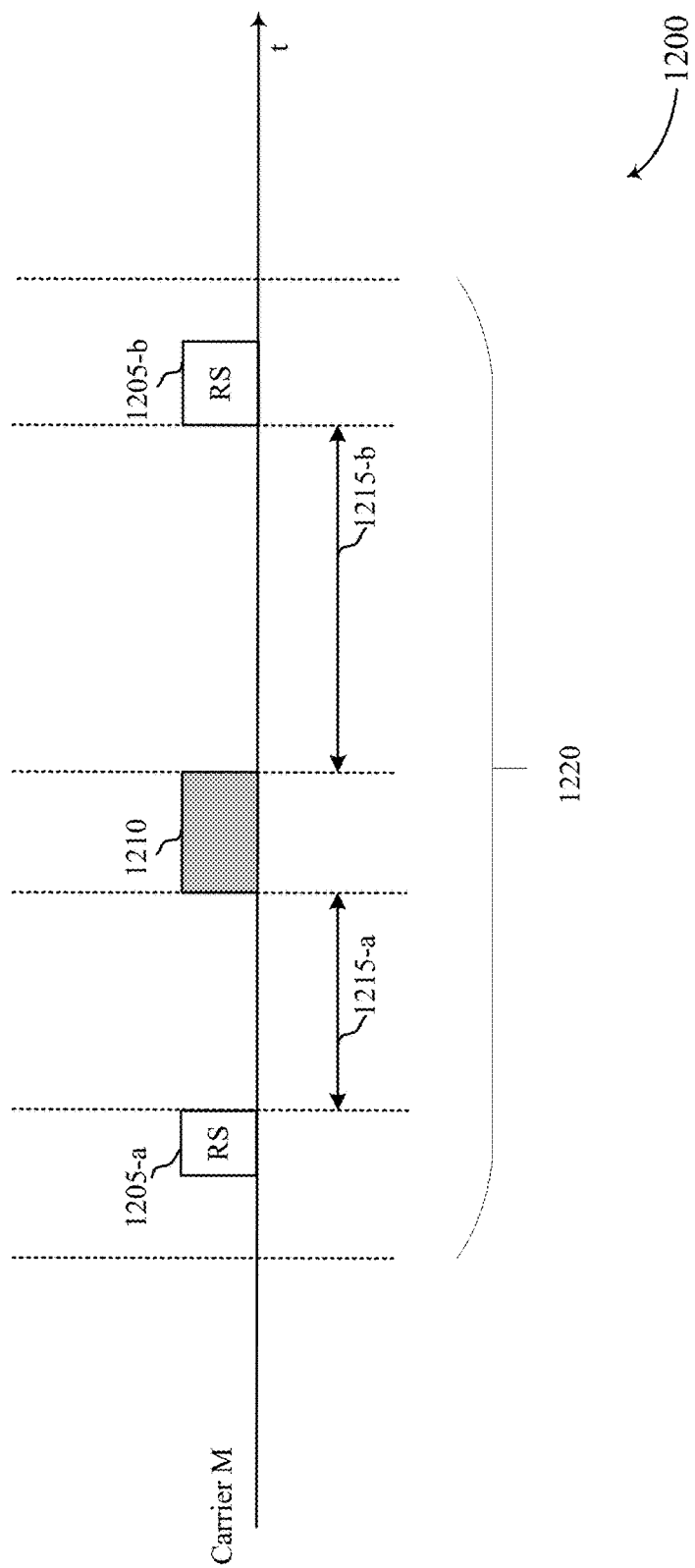
FIG. 12 illustrates an example of a timing diagram that supports cross-carrier scheduling for wireless devices in accordance with aspects of the present disclosure.

The examples described herein may also intelligently manage when the UE 115-*a* monitors for reference signals on a carrier. FIG. 12 illustrates an example of a timeline 1200 that supports cross-carrier scheduling for wireless devices in accordance with various aspects of the present disclosure. A reference signal, such as, for example, a narrowband reference signal (NRS) may be a pilot signal inserted into a downlink signal by base station 105-*a*. The UE 115-*a* perform downlink channel estimation using the NRS. The UE 115-*a* uses the downlink channel estimation for performing coherent demodulation of a downlink signal. In conventional systems, the UE 115-*a* may periodically monitor for NRSs on carriers configured to transport PDSCH transmissions to maintain synchronization with those carriers. Continually monitoring a carrier when there are no PDSCH transmissions may needless drain a battery of the UE 115-*a*, particularly if the UE 115-*a* is an IoT device.

In the examples described herein, the UE 115-*a* may monitor a first carrier within a time interval if PDSCH for the UE 115-*a* is scheduled on that carrier. Otherwise, the UE 115-*a* may refrain from monitoring the first carrier for NRS transmissions unless a grant on a PDCCH carrier indicates that the UE 115-*a* has been allocated resources on the first carrier. When allocated resources, the UE 115-*a* may search for NRS transmissions on the first carrier to obtain synchronization for decoding a PDSCH transmission on the first carrier. The base station 105-*a* may also refrain from sending NRS transmission on the first carrier unless the base station 105-*a* also has PDSCH transmissions to send on the first carrier.

When the base station 105-*a* sends a grant 410 to the UE 115-*a* for allocating PDSCH resources to the UE 115-*a* on the first carrier for a PDSCH transmission, the base station 105-*a* may send one or more NRS transmissions on the first carrier. With reference to FIG. 12, the base station 105-*a* may send NRS transmissions within a particular time interval 1220 that is before and after the allocated PDSCH resources 1210. For example, the base station 105-*a* may send one or more NRS transmissions 1205-*a* on Carrier M at a defined time interval 1215-*a* prior to a PDSCH transmission 1210, and may continue sending one or more NRS transmissions 1205-*b* on Carrier M for a defined time interval 1215-*b* after an end of the PDSCH transmission 1210. The defined time intervals 1215-*a*, 1215-*b* may be the same duration or may differ. For example, the base station 105-*a* may send M subframes or M valid/guaranteed NRS subframes before the start of PDSCH 1210, where M is a positive integer. The base station 105-*a* may send N subframes or N valid/guaranteed NRS subframes after end of PDSCH 1210, where N is a positive integer. N and M may be the same number, or different numbers.

The base station 105-*a* may also send a NRS transmission on Carrier M prior to transmitting ACK feedback within allocated ACK resources to the UE 115-*a*. In an example, the UE 115-*a* may send a PUSCH transmission on Carrier M, and the base station 105-*a* may send a NRS transmission for a defined amount of time before and/or after transmitting ACK feedback on Carrier M (or other carrier assigned to communicate ACK feedback). For example, the base station 105-*a* may send an NRS transmission, where M1 is a positive integer, M1 subframes before and/or after transmitting ACK feedback in a subframe on Carrier M. In another example, the base station 105-*a* may send a NRS transmission for a defined amount of time before and/or after transmission of control data, such as a PDCCH transmission. In an example, the base station 105-*a* may send a NRS transmission for N1 subframes or N1 valid/guaranteed NRS subframes before and/or after an end of a PDCCH transmission, where N1 is a positive integer. M1 and N1 may be the same number, or different numbers.

The examples provided herein may also provide for maintaining synchronization for mis-decodes by the UE 115-*a*. A mis-decode may refer to the situation when the UE 115-*a* believes it has correctly decoded a grant 410 addressed to the UE 115-*a*, when in fact the UE 115-*a* has decoded noise or a grant addressed to a different UE. In some cases, the UE 115-*a* may tune to a different carrier based on the mis-decode, and might lose time and/or frequency synchronization with a carrier. In some examples, the base station 105-*a* may provide gaps in allocated DL PDSCH resources on a PDSCH carrier for large repetitions so that, during the gap, the UE 115-*a* may retune to the PDCCH carrier for synchronization using, for example, time tracking loops (TTL), frequency tracking loops (FTL), and/or the like.

The examples described herein may reduce the number of gaps in PDSCH transmissions. Conventionally, because PDSCH transmissions may be scheduled for a particular UE 115 for a lengthy amount of time that uses a large number of repetitions, the base station 105-*a* may insert gaps in the allocated PDSCH resources for scheduling other UEs. The other UEs may receive an signal of acceptable strength, quality, or the like, from the base station 105-*a*, but are blocked from scheduling due to PDSCH transmissions scheduled for the particular UE 115. For example, radio frames 305 of a carrier may repeat in increments of 1024, and, if this carrier cannot serve any other UE, conventionally gaps are introduced (e.g., 40 ms gaps) such that a different UE in good coverage can be served by the base station 105-*a*. Conventionally, if a PDSCH transmission uses more than X ms, then the base station 105-*a* inserts gaps in the allocated PDSCH resources. Otherwise the base station 105-*a* doesn't insert the gaps.

In the examples described herein, cross-carrier scheduling reduces and/or eliminates the need for scheduling gaps since PDSCH is transmitted on a different carrier than PDCCH, which is used to schedule UEs. In some examples, the base station 105-*a* may not provide any gaps in allocated PDSCH resources if there are separate PDCCH and PDSCH carriers. The base station 105-*a* may use the PDCCH to cross-carrier schedule UEs on the PDSCH. In another example, the base station 105-*a* may not schedule gaps in allocated PDSCH resources if PDCCH and PDSCH use different carriers. In another example, the base station 105-*a* may not schedule gaps in allocated PDSCH resources if the base station 105-*a* has the option to schedule a PDSCH transmission on carrier different than a PDCCH carrier, even if grants and PDSCH transmissions are send on the same carrier (e.g., both sent on the PDCCH carrier). In some cases, the UE 115-*a* may determine that a scheduling gap is not included within allocated PDSCH resources based at least in part on determining that a carrier of the PDSCH resources is different than a carrier of the PDCCH.

In a further example, the base station 105-a may have the option to schedule gaps in allocated PDSCH resources. For instance, during connection establishment and/or reconfiguration (e.g., using RRC signaling), the base station 105-a may send control data identifying which one or more carriers that may be used for cross-carrier scheduling, and whether scheduling gaps within allocated PDSCH resources on the one or more carriers are enabled. The control data may include a field that indicating whether scheduling gaps are included on all of the one or more carriers. In other examples, the control data may include a field per carrier that signals if gaps scheduling gaps are included on a carrier by carrier basis. The field may be explicit (e.g. one ON/OFF field for all carriers or each carrier) or implicit (e.g., a value of X may be signaled per carrier, and the X value may indicate whether scheduling gaps are enabled (e.g., X=inf to indicate gaps are never applied, X=0 to indicate that gaps are enabled)).

The UE 115-a may also provide CSI feedback on some or all of the carriers. In some examples, the set of carriers for CSI feedback may be the same or different from the set of carriers for PDCCH and/or PDSCH transmissions. In some cases, the UE 115-a may monitor only the PDCCH carrier, and provide a CSI report with CSI feedback only on the PDCCH carrier. In other cases, the UE 115-a may monitor and provide a CSI report with CSI feedback only on a single PDSCH carrier. In further examples, the UE 115-a may monitor a set of carriers, and may a CSI report may include CSI feedback based on a statistical value (e.g., an average) of all monitored carriers UE monitors (e.g., best effort monitoring by UE). In additional examples, the UE 115-a may monitor a set of carriers, and may provide a different CSI report for each monitored carrier that includes respective CSI feedback for each) monitored carrier. In a further example, the UE 115-a may monitor a set of carriers, and may a CSI report with CSI feedback for a carrier in the set determined to be the best (e.g., based on CSI measurements). In other examples, the UE 115-a may perform different combinations of the types of CSI reporting discussed above. In some cases, the UE 115-a may cycle through providing the different types of CSI reports over time, and/or may simultaneously provide multiple CSI reports of the different types of CSI reports. In some examples, the base station 105-a may send control data in a PDCCH transmission instructing the UE 115-a which carrier, or combinations of carriers, to measure for CSI reporting. The control data may also schedule measurement gaps within the one or more carriers to enable the UE 115-a to perform CSI measurements. The base station 105-a may monitor how recently it received CSI feedback on each carrier, and may instruct the UE 115-a to measure one or more of the carriers if CSI feedback has not been measured within a defined amount of time. The base station 105-a may also maintain information indicating a transmission power level for each carrier, and may scale the CSI to account for differences in transmission power levels when comparing carriers.

In some examples, CSI feedback for different DL carriers may be provided on different UL carriers or on a common UL carrier. For example, the UE 115-a may transmit first UCI that includes CSI feedback for a first DL carrier on a first UL carrier, and may transmit second UCI that includes CSI feedback for a second DL carrier on a second UL carrier.

In another example, the UE 115-a may transmit UCI that includes CSI feedback for each of first and second DL carriers on a first UL carrier.

The examples provided herein may also use frequency diversity to improve communication between the base station 105 and one or more UEs 115. In an example, the base station 105 may signal to the UE 115-a a frequency hopping pattern for PDSCH and/or PUSCH transmissions. The frequency hopping pattern specify that the PDSCH and/or PUSCH transmissions periodically switch between carriers in a defined hopping pattern, using, for example, a pseudo-random sequence known to both the base station 105-a and the UE 115-a. In an example, the frequency hopping pattern may be established during connection setup and/or reconfiguration (e.g., using RRC signaling), or may be dynamically enabled. In an example, DCI may include a bit to indicate when frequency hopping is enabled. The set of carriers that may be used for frequency hopping may be same as, or different than, the set of carriers configured for cross-carrier scheduling. In some examples, the same bits in a grant 410 used for indicating which cross-carrier scheduling carrier to use may be jointly encoded with a hopping enable bit to give information about hopping (e.g., first carrier, carrier hopping order, number of subframes per carrier before each hop, and/or the like). As in the above examples, the base station 105 may specify a time duration between hops to allow the UE 115-a to tune from carrier to carrier.

Figure 13:
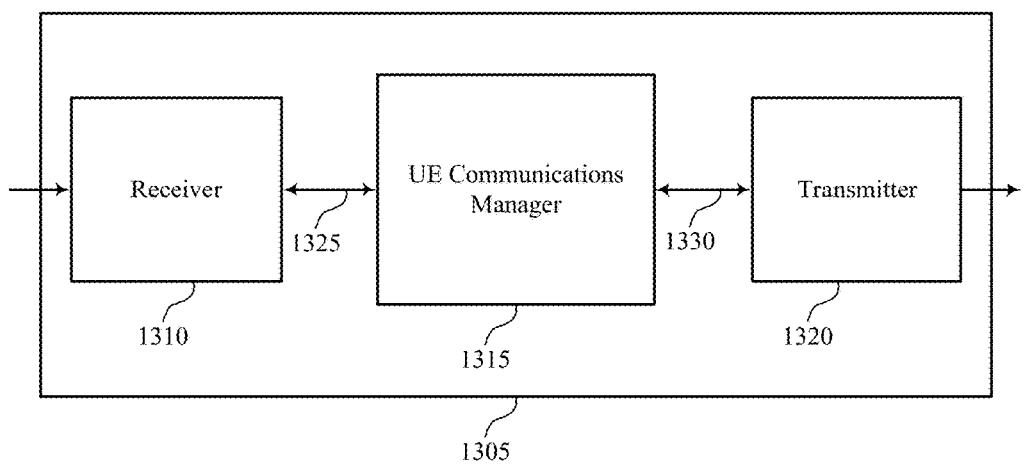
FIGS. 13 through 15 show block diagrams of a device that supports cross-carrier scheduling for wireless devices in accordance with aspects of the present disclosure.

FIG. 13 shows a block diagram 1300 of a wireless device 1305 that supports cross-carrier scheduling for wireless devices in accordance with aspects of the present disclosure. Wireless device 1305 may be an example of aspects of a user equipment (UE) 115 as described with reference to FIG. 1. Wireless device 1305 may include receiver 1310 connected to UE communications manager 1315 via communication link 1325, and UE communications manager 1315 may be connected to transmitter 1320 via communication link 1330. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to cross-carrier scheduling for wireless devices, etc.). Information may be passed on to other components of the device. The receiver 1310 may be an example of aspects of the transceiver 1635 described with reference to FIG. 16. The receiver 1310 may utilize a single antenna or a set of antennas.

UE communications manager 1315 may be an example of aspects of the UE communications manager 1615 described with reference to FIG. 16.

UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1315 may monitor a control channel on a first carrier of a set of carriers to obtain a grant allocating resources to the wireless device within a shared data channel, where a time duration between the grant and the allocated resources within the shared data channel is based on which carrier of the set of carriers transports the shared data channel. The UE communications manager 1315 may transmit or receive over the shared data channel using the allocated resources and based on the time duration.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
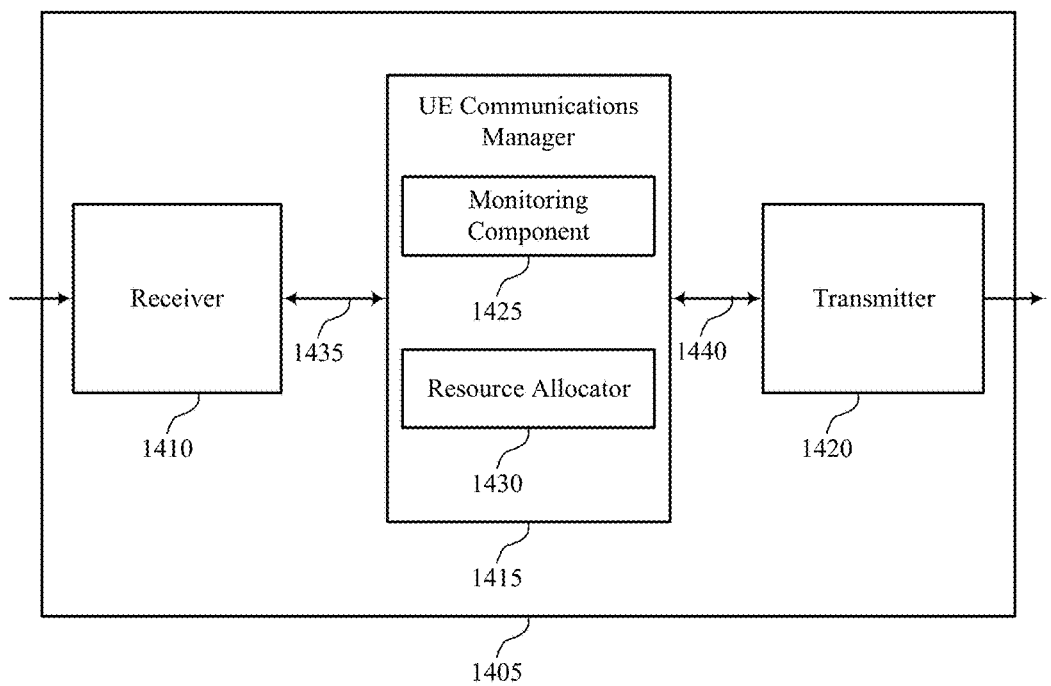

FIG. 14 shows a block diagram 1400 of a wireless device 1405 that supports cross-carrier scheduling for wireless devices in accordance with aspects of the present disclosure. Wireless device 1405 may be an example of aspects of a wireless device 1305 or a UE 115 as described with reference to FIGS. 1 and 13. Wireless device 1405 may include receiver 1410 connected to UE communications manager 1415 via communication link 1435, and UE communications manager 1415 may be connected to transmitter 1420 via communication link 1440. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to cross-carrier scheduling for wireless devices, etc.). Information may be passed on to other components of the device. The receiver 1410 may be an example of aspects of the transceiver 1635 described with reference to FIG. 16. The receiver 1410 may utilize a single antenna or a set of antennas.

UE communications manager 1415 may be an example of aspects of the UE communications manager 1615 described with reference to FIG. 16.

UE communications manager 1415 may also include monitoring component 1425 and resource allocator 1430.

Monitoring component 1425 may monitor a control channel on a first carrier of a set of carriers to obtain a grant allocating resources to the wireless device (e.g., UE 115) within a shared data channel, where a time duration between the grant and the allocated resources within the shared data channel is based on which carrier of the set of carriers transports the shared data channel.

Monitoring component 1425 may monitor for a reference signal on a carrier of the set of carriers within a time interval that includes a first defined amount of time prior to a beginning of a scheduled transmission to the wireless device on the carrier and a second defined amount of time after an end of the scheduled transmission. Monitoring component 1425 may refrain from monitoring the carrier for the reference signal outside of the time interval.

In some cases, monitoring the control channel includes determining, based on the grant, that the shared data channel is transported on a second carrier of the set of carriers, the second carrier differing from the first carrier. In some cases, the time duration includes an added amount of time and a defined amount of time based at least in part on the transmitting or receiving occurring via a second carrier that differs from the first carrier. In some cases, the time duration includes an amount of time between the second instance of the control channel and a beginning of the allocated resources. In some cases, the scheduled transmission is a transmission to the wireless device within the allocated resources, or transmission of an acknowledgment to the wireless device, or transmission of control data to the wireless device within the control channel. In some cases, the time duration is an amount of time, a number of subframes, or both.

In some cases, the time duration is based on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof. When Hybrid Automatic Repeat reQuest (hybrid automatic repeat request (HARQ)) is enabled, the time duration may include an amount of time to enable the wireless device to receive a second instance of the control channel on the first carrier or a second carrier of the set of carriers prior to the transmitting or receiving over the shared data channel using the allocated resources.

Resource allocator 1430 may transmit or receive over the shared data channel using the allocated resources and based on the time duration. Resource allocator 1430 may receive a second grant within a second instance of the control channel, the second grant allocating second resources within the shared data channel at a time different than a time of the allocated resources. Resource allocator 1430 may determine, based on the first and second carrier indices, that the allocated resources and the second allocated resources are not allocated on a same carrier of the set of carriers. In some cases, a time gap between a timing of the allocated resources and a timing of the second allocated resources is based on the allocated resources and the second allocated resources not being on the same carrier. In some cases, the allocated resources include a set of sets of resources within the shared data channel, each set of resources being associated with a different time and different transport block.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
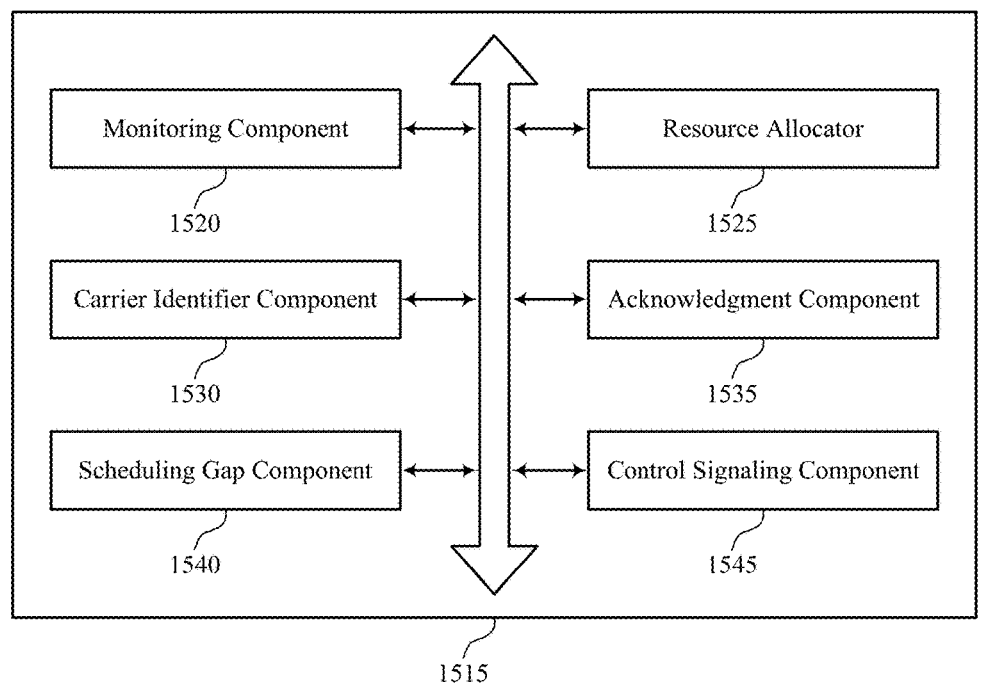

FIG. 15 shows a block diagram 1500 of a UE communications manager 1515 that supports cross-carrier scheduling for wireless devices in accordance with aspects of the present disclosure. The UE communications manager 1515 may be an example of aspects of a UE communications manager 1315, a UE communications manager 1415, or a UE communications manager 1615 described with reference to FIGS. 13, 14, and 16. The UE communications manager 1515 may include monitoring component 1520, resource allocator 1525, carrier identifier component 1530, acknowledgment component 1535, scheduling gap component 1540, and control signaling component 1545. Each of these modules may communicate, directly or indirectly, with one another (e.g., via one or more buses).

Monitoring component 1520 may monitor a control channel on a first carrier of a set of carriers to obtain a grant allocating resources to a wireless device (e.g., UE 115) within a shared data channel. In some cases, a time duration between the grant and the allocated resources within the shared data channel is based on which carrier of the set of carriers transports the shared data channel. Monitoring component 1520 may monitor for a reference signal on a carrier of the set of carriers within a time interval that includes a first defined amount of time prior to a beginning of a scheduled transmission to the wireless device on the carrier and a second defined amount of time after an end of the scheduled transmission. Monitoring component 1520 may refrain from monitoring the carrier for the reference signal outside of the time interval.

In some cases, monitoring the control channel includes determining, based on the grant, that the shared data channel is transported on a second carrier of the set of carriers, the second carrier differing from the first carrier. In some cases, the time duration includes an added amount of time and a defined amount of time based at least in part on the transmitting or receiving occurring via a second carrier that differs from the first carrier. In some cases, the time duration includes an amount of time between the second instance of the control channel and a beginning of the allocated resources. In some cases, the scheduled transmission is a transmission to the wireless device within the allocated resources, or transmission of an acknowledgment to the wireless device, or transmission of control data to the wireless device within the control channel. In some cases, the time duration is an amount of time, a number of subframes, or both.

In some cases, the time duration is based on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof. When Hybrid Automatic Repeat reQuest (HARQ) is enabled, the time duration includes an amount of time to enable the wireless device to receive a second instance of the control channel on the first carrier or a second carrier of the set of carriers prior to the transmitting or receiving over the shared data channel using the allocated resources.

Resource allocator 1525 may transmit or receive over the shared data channel using the allocated resources and based on the time duration. Resource allocator 1525 may receive a second grant within the second instance of the control channel, the second grant allocating second resources within the shared data channel at a time different than a time of the allocated resources. Resource allocator 1525 may determine, based on the first and second carrier indices, that the allocated resources and the second allocated resources are not allocated on a same carrier of the set of carriers. In some cases, a time gap between a timing of the allocated resources and a timing of the second allocated resources is based on the allocated resources and the second allocated resources not being on the same carrier. In some cases, the allocated resources include a set of sets of resources within the shared data channel, each set of resources being associated with a different time and different transport block.

Carrier identifier component 1530 may determine, based on the first and second carrier indices, that a carrier of the set of carriers for a first uplink transmission differs from a carrier of the set of carriers for a second uplink transmission, where a time gap between a timing of the first uplink transmission and a timing of the second uplink transmission is based on the carrier for the first uplink transmission differing from the carrier for the second uplink transmission. In some cases, monitoring the control channel includes receiving downlink control information over the control channel, the downlink control information indicating whether the shared data channel is transported on the first carrier.

Acknowledgment component 1535 may process downlink control information received over the control channel, the downlink control information indicating a carrier of the set of carriers for an acknowledgment message corresponding to the allocated resources. In some cases, the first uplink transmission is a first uplink acknowledgment for the allocated resources and the second uplink transmission is a second uplink acknowledgment for the second allocated resources.

Scheduling gap component 1540 may determine that a scheduling gap is not included within the allocated resources based on determining that the first carrier is different than the carrier transporting the shared data channel.

Control signaling component 1545 may receive control signaling during a connection establishment, a connection reconfiguration, or both, the control signaling indicating whether the carrier transporting the shared data channel includes a scheduling gap and receive control signaling during a connection setup, a connection reconfiguration, or both, the control signaling configuring the wireless device with the time duration.

Figure 16:
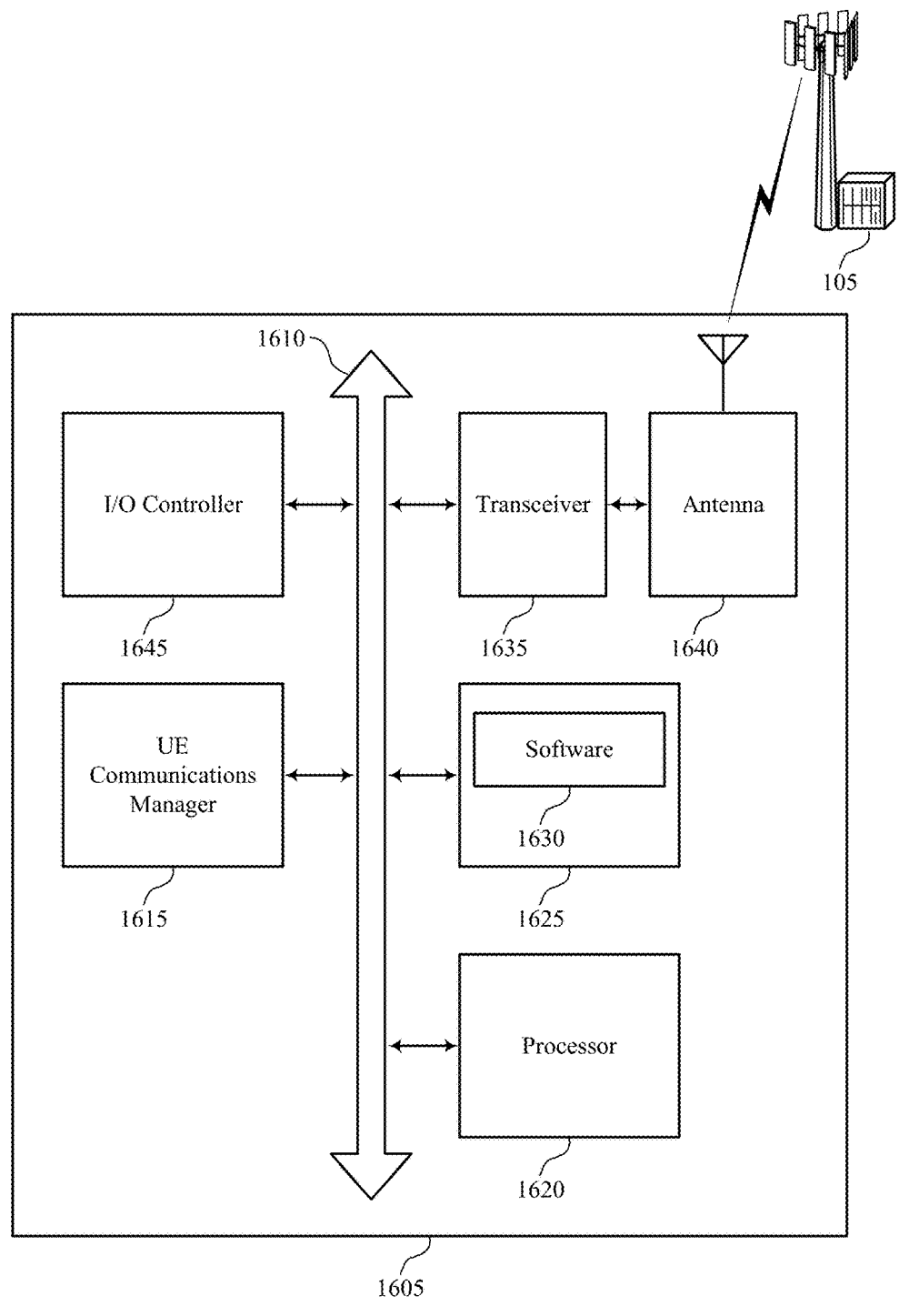
FIG. 16 illustrates a block diagram of a system including a UE that supports cross-carrier scheduling for wireless devices in accordance with aspects of the present disclosure.

FIG. 16 shows a diagram of a system 1600 including a device 1605 that supports cross-carrier scheduling for wireless devices in accordance with aspects of the present disclosure. Device 1605 may be an example of or include the components of wireless device 1305, wireless device 1405, or a UE 115 as described above, e.g., with reference to FIGS. 1, 13 and 14. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more busses (e.g., bus 1610). Device 1605 may communicate wirelessly with one or more base stations 105.

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting cross-carrier scheduling for wireless devices).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware and/or software operation such as the interaction with peripheral components or devices.

Software 1630 may include code to implement aspects of the present disclosure, including code to support cross-carrier scheduling for wireless devices. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
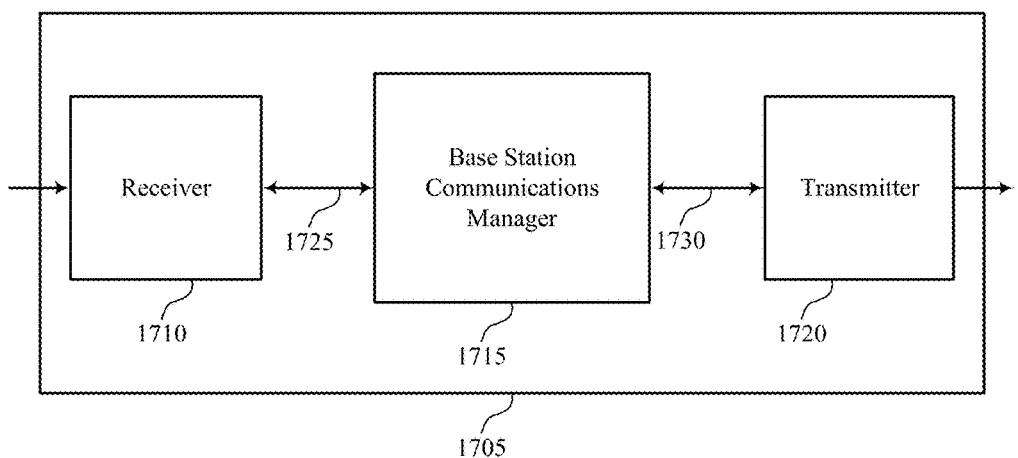
FIGS. 17 through 19 show block diagrams of a device that supports cross-carrier scheduling for wireless devices in accordance with aspects of the present disclosure.

FIG. 17 shows a block diagram 1700 of a wireless device 1705 that supports cross-carrier scheduling for wireless devices in accordance with aspects of the present disclosure. Wireless device 1705 may be an example of aspects of a base station 105 as described with reference to FIG. 1. Wireless device 1705 may include receiver 1710 connected to base station communications manager 1715 via communication link 1725, and base station communications manager 1715 may be connected to transmitter 1720 via communication link 1730. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to cross-carrier scheduling for wireless devices, etc.). Information may be passed on to other components of the device. The receiver 1710 may be an example of aspects of the transceiver 2035 described with reference to FIG. 20. The receiver 1710 may utilize a single antenna or a set of antennas.

Base station communications manager 1715 may be an example of aspects of the base station communications manager 2015 described with reference to FIG. 20.

Base station communications manager 1715 and/or at least some of its various sub-components may be implemented in hardware, software executed by a processor, firmware, or any combination thereof. If implemented in software executed by a processor, the functions of the base station communications manager 1715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1715 and/or at least some of its various sub-components may be physically located at various positions, including being distributed such that portions of functions are implemented at different physical locations by one or more physical devices. In some examples, base station communications manager 1715 and/or at least some of its various sub-components may be a separate and distinct component in accordance with various aspects of the present disclosure. In other examples, base station communications manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1715 may determine to schedule communication for a wireless device, determine a time duration relative to a control channel of when to allocate resources to the wireless device for the communication, where the time duration is based on which carrier of a set of carriers transports a shared data channel, and transmit a grant in the control channel to the wireless device identifying a timing of the allocated resources within the shared data channel based on the time duration.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may utilize a single antenna or a set of antennas.

Figure 18:
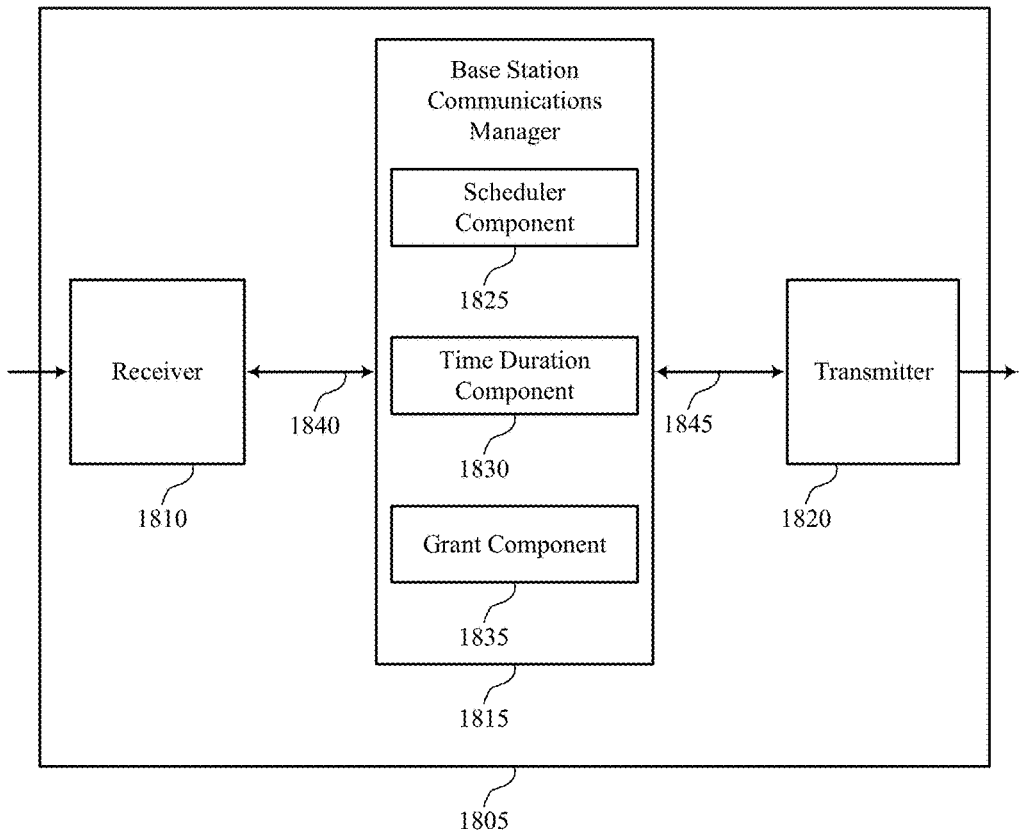

FIG. 18 shows a block diagram 1800 of a wireless device 1805 that supports cross-carrier scheduling for wireless devices in accordance with aspects of the present disclosure. Wireless device 1805 may be an example of aspects of a wireless device 1705 or a base station 105 as described with reference to FIGS. 1 and 17. Wireless device 1805 may include receiver 1810 connected to base station communications manager 1815 via communication link 1840, and base station communications manager 1815 may be connected to transmitter 1820 via communication link 1845. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to cross-carrier scheduling for wireless devices, etc.). Information may be passed on to other components of the device. The receiver 1810 may be an example of aspects of the transceiver 2035 described with reference to FIG. 20. The receiver 1810 may utilize a single antenna or a set of antennas.

Base station communications manager 1815 may be an example of aspects of the base station communications manager 2015 described with reference to FIG. 20.

Base station communications manager 1815 may also include scheduler component 1825, time duration component 1830, and grant component 1835.

Scheduler component 1825 may determine to schedule communication for a wireless device.

Time duration component 1830 may determine a time duration relative to a control channel of when to allocate resources to the wireless device for the communication, where the time duration is based on which carrier of a set of carriers transports a shared data channel and determine that a carrier of the set of carriers for a first uplink transmission differs from a carrier of the set of carriers for a second uplink transmission. In some cases, the time duration includes an amount of time based on the control channel being transported on a first carrier of the set of carriers and the shared data channel being transported on a second carrier of the set of carriers, the first carrier differing from the second carrier. In some cases, the time duration enables the wireless device to receive a second instance of the control channel prior to transmitting or receiving over the shared data channel using the allocated resources. In some cases, the time duration includes an amount of time between the second instance of the control channel and a beginning of the allocated resources.

In some cases, the first uplink transmission is a first uplink acknowledgment for the allocated resources and the second uplink transmission is a second uplink acknowledgment for the second allocated resources. In some cases, the control channel and the shared data channel are transported on a same carrier of the set of carriers. In some cases, the control channel and the shared data channel are transported on different carriers of the set of carriers. In some cases, the time duration is an amount of time or a number of subframes. In some cases, the time duration is based on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof.

Grant component 1835 may transmit a grant in the control channel to the wireless device identifying a timing of the allocated resources within the shared data channel based on the time duration, transmit a second grant within the second instance of the control channel, the second grant allocating second resources within the shared data channel at a time different than a time of the allocated resources. Grant component 1835 may determine that the allocated resources indicated in the grant and the second allocated resources indicated in the second grant are not allocated on a same carrier of the set of carriers. In some cases, the grant includes the time duration. In some cases, the grant allocates second resources within the shared data channel at a time different than a time of the allocated resources.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may utilize a single antenna or a set of antennas.

Figure 19:
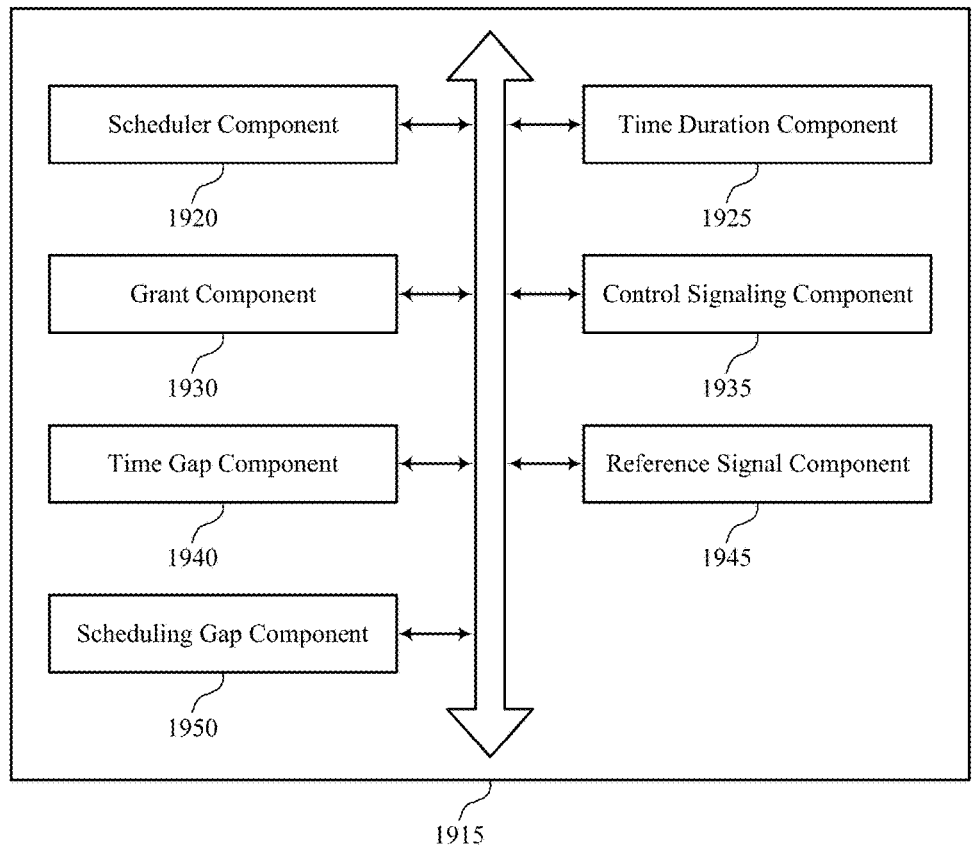

FIG. 19 shows a block diagram 1900 of a base station communications manager 1915 that supports cross-carrier scheduling for wireless devices in accordance with aspects of the present disclosure. The base station communications manager 1915 may be an example of aspects of a base station communications manager 2015 described with reference to FIGS. 17, 18, and 20. The base station communications manager 1915 may include scheduler component 1920, time duration component 1925, grant component 1930, control signaling component 1935, time gap component 1940, reference signal component 1945, and scheduling gap component 1950. Each of these modules may communicate, directly or indirectly, with one another (e.g., via one or more buses).

Scheduler component 1920 may determine to schedule communication for a wireless device.

Time duration component 1925 may determine a time duration relative to a control channel of when to allocate resources to the wireless device for the communication, where the time duration is based on which carrier of a set of carriers transports a shared data channel and determine that a carrier of the set of carriers for a first uplink transmission differs from a carrier of the set of carriers for a second uplink transmission. In some cases, the time duration includes an amount of time based on the control channel being transported on a first carrier of the set of carriers and the shared data channel being transported on a second carrier of the set of carriers, the first carrier differing from the second carrier. In some cases, the time duration enables the wireless device to receive a second instance of the control channel prior to transmitting or receiving over the shared data channel using the allocated resources. In some cases, the time duration includes an amount of time between the second instance of the control channel and a beginning of the allocated resources.

In some cases, the first uplink transmission is a first uplink acknowledgment for the allocated resources and the second uplink transmission is a second uplink acknowledgment for the second allocated resources. In some cases, the control channel and the shared data channel are transported on a same carrier of the set of carriers. In some cases, the control channel and the shared data channel are transported on different carriers of the set of carriers. In some cases, the time duration is an amount of time or a number of subframes. In some cases, the time duration is based on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof.

Grant component 1930 may transmit a grant in the control channel to the wireless device identifying a timing of the allocated resources within the shared data channel based on the time duration, transmit a second grant within the second instance of the control channel, the second grant allocating second resources within the shared data channel at a time different than a time of the allocated resources. Grant component 1930 may determine that the allocated resources indicated in the grant and the second allocated resources indicated in the second grant are not allocated on a same carrier of the set of carriers. In some cases, the grant includes the time duration. In some cases, the grant allocates second resources within the shared data channel at a time different than a time of the allocated resources.

Control signaling component 1935 may transmit downlink control information in the control channel indicating a carrier of the set of carriers for an acknowledgment message corresponding to the allocated resources, and transmit control signaling to the wireless device during a connection setup, a connection reconfiguration, or both, the control signaling indicating whether the carrier transporting the shared data channel includes a scheduling gap. Control signaling component 1935 may signal the time duration to the wireless device during a connection setup, a connection reconfiguration, or both.

Time gap component 1940 may determine a time gap between a timing of the allocated resources and a timing of the second allocated resources based on the allocated resources and the second allocated resources not being on the same carrier and determine a time gap between a timing of the first uplink transmission and a timing of the second uplink transmission based on the carrier for the first uplink transmission differing from the carrier for the second uplink transmission.

Reference signal component 1945 may identify an amount of time prior to a beginning of a scheduled transmission to the wireless device on a carrier of the set of carriers and after an ending of the scheduled transmission to the wireless device on the carrier. Reference signal component 1945 may transmit a reference signal one or more times on the carrier within the identified amount of time, determine that no additional transmissions have been scheduled on the carrier prior to and after the identified amount of time, and refrain from transmitting the reference signal on the carrier outside of the identified amount of time. In some cases, the scheduled transmission is a transmission to the wireless device within the allocated resources, or transmission of an acknowledgment to the wireless device, or transmission of control data to the wireless device within the control channel.

Scheduling gap component 1950 may determine not to include a scheduling gap within the allocated resources based on a carrier of the set of carriers transporting the control channel being different than the carrier transporting the shared data channel.

Figure 20:
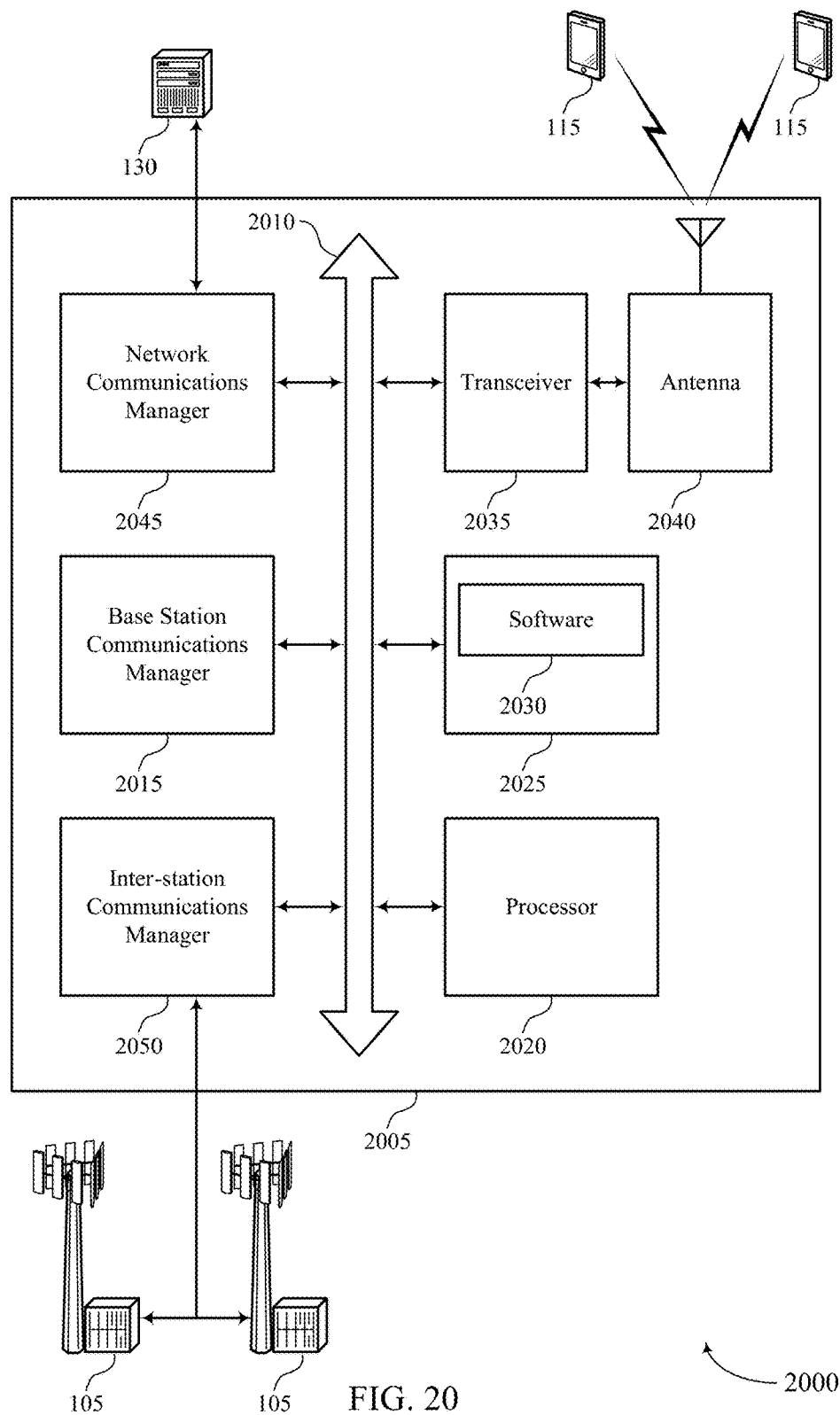
FIG. 20 illustrates a block diagram of a system including a base station that supports cross-carrier scheduling for wireless devices in accordance with aspects of the present disclosure.

FIG. 20 shows a diagram of a system 2000 including a device 2005 that supports cross-carrier scheduling for wireless devices in accordance with aspects of the present disclosure. Device 2005 may be an example of or include the components of base station 105 as described above, e.g., with reference to FIG. 1. Device 2005 may include components for bi-directional voice and data communications including components for transmitting and receiving communications, including base station communications manager 2015, processor 2020, memory 2025, software 2030, transceiver 2035, antenna 2040, network communications manager 2045, and inter-station communications manager 2050. These components may be in electronic communication via one or more busses (e.g., bus 2010). Device 2005 may communicate wirelessly with one or more UEs 115.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting cross-carrier scheduling for wireless devices).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware and/or software operation such as the interaction with peripheral components or devices.

Software 2030 may include code to implement aspects of the present disclosure, including code to support cross-carrier scheduling for wireless devices. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Inter-station communications manager 2050 may manage communications with other base station 105, and may include a controller or scheduler for controlling communications with UEs 115 in cooperation with other base stations 105. For example, the inter-station communications manager 2050 may coordinate scheduling for transmissions to UEs 115 for various interference mitigation techniques such as beamforming or joint transmission. In some examples, inter-station communications manager 2050 may provide an X2 interface within an Long Term Evolution (LTE)/LTE-A wireless communication network technology to provide communication between base stations 105.

Figure 21:
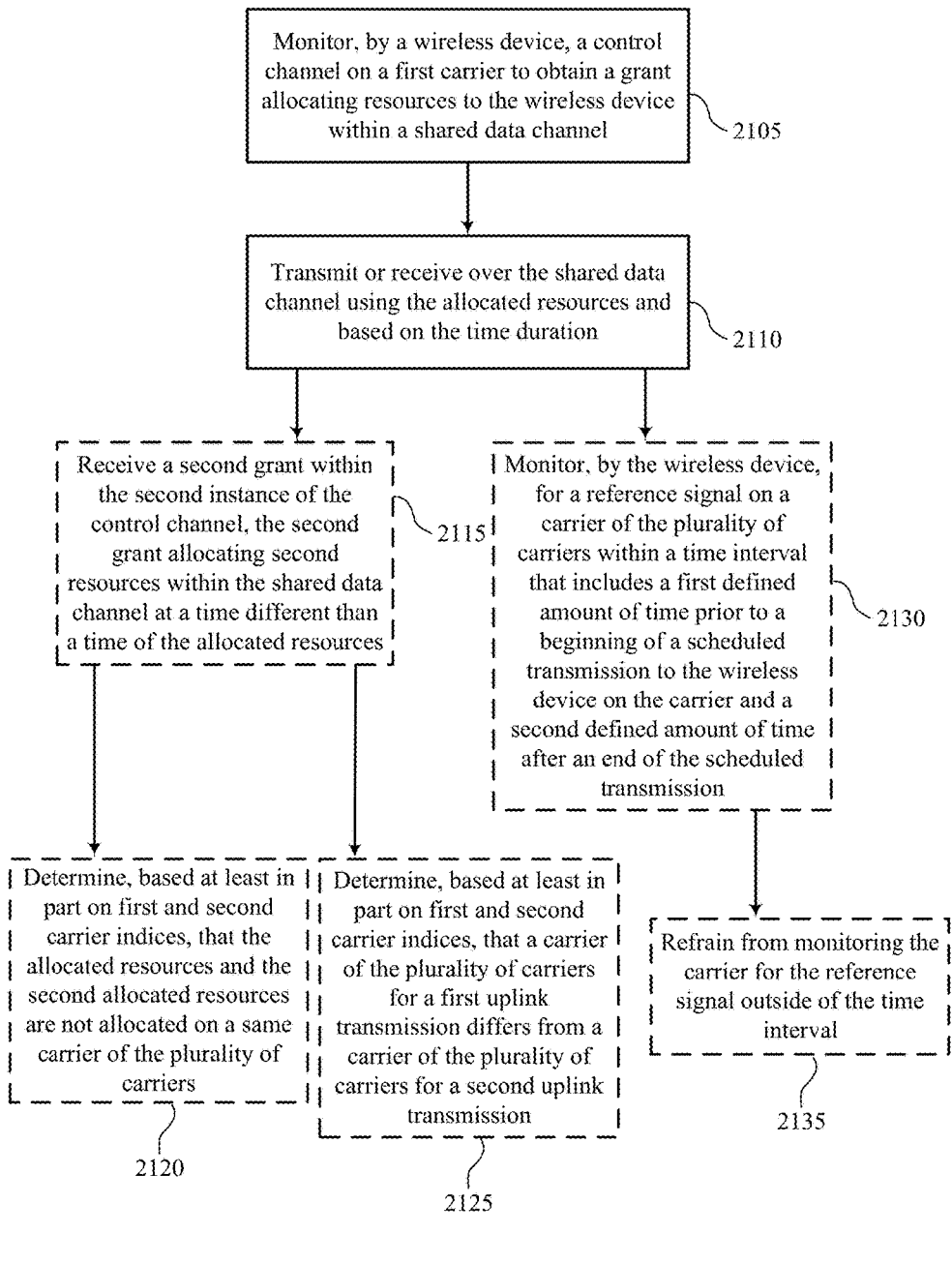
FIGS. 21 through 24 illustrate methods for cross-carrier scheduling for wireless devices in accordance with aspects of the present disclosure.

FIG. 21 shows a flowchart illustrating a method 2100 for cross-carrier scheduling for wireless devices in accordance with aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may monitor a control channel on a first carrier of a plurality of carriers to obtain a grant allocating resources to the UE 115 within a shared data channel, wherein a time duration between the grant and the allocated resources within the shared data channel is based at least in part on which carrier of the plurality of carriers transports the shared data channel. The UE 115 may, for example, identify time-frequency resources of a PDCCH transported on a PDCCH carrier, the receiver 1310 of the UE 115 may receive a signal within the identified time-frequency resources carrying the PDCCH, and the UE 115 may decode bits transmitted during those time-frequency resources to obtain grant 410. The operations of block 2105 may be performed according to the methods described with reference to FIGS. 1 through 12. In certain examples, aspects of the operations of block 2105 may be performed by a monitoring component as described with reference to FIGS. 13 through 16.

At block 2110 the UE 115 may transmit or receive over the shared data channel using the allocated resources and based at least in part on the time duration. The UE 115 may, for example, process the grant 410 to determine whether resources allocated to the UE 115 are on a same carrier as the PDCCH or on a different carrier (e.g., PDSCH carrier, PUSCH carrier, etc.). If on the same carrier and downlink shared data channel resources are allocated, the UE 115 may attempt to receive and decode the downlink shared data channel of the same carrier corresponding to the time duration (e.g., decode PDSCH on PDCCH carrier after time duration 425). If on the same carrier and uplink shared data channel resources are allocated, the UE 115 may attempt to transmit using an uplink transmission on the same carrier corresponding to the time duration (e.g., transmit PUSCH on PDCCH carrier after time duration 425). If on different carriers and downlink shared data channel resources are allocated, the UE 115 may attempt to receive and decode the downlink shared data channel on the different carrier corresponding to the time duration (e.g., decode PDSCH on PDSCH carrier after time duration 425). If on different carriers and uplink shared data channel resources are allocated, the UE 115 may attempt to transmit using an uplink transmission on the different carrier corresponding to the time duration (e.g., transmit PUSCH on PUSCH carrier after time duration 425). The operations of block 2110 may be performed according to the methods described with reference to FIGS. 1 through 12. In certain examples, aspects of the operations of block 2110 may be performed by a resource allocator as described with reference to FIGS. 13 through 16.

In some examples, the time duration (e.g., transmit PUSCH on PDCCH carrier after time duration 425) between the grant and the allocated resources within the shared data channel may be based at least in part on whether cross-carrier scheduling is enabled. For example, if cross-carrier scheduling is enabled, a minimum delay between the grant and one of PDSCH or PUSCH is larger than a delay between the grant and the one PDSCH or PUSCH when cross-carrier scheduling is not enabled.

In some examples, the time duration (e.g., transmit PUSCH on PDCCH carrier after time duration 425) between the grant and the allocated resources within the shared data channel may be further based at least in part on whether the scheduling on another carrier of the plurality of carriers is permissible, the other carrier being different from the carrier that transports the shared data channel.

In some options, at block 2115 the UE 115 may receive a second grant within the second instance of the control channel, the second grant allocating second resources within the shared data channel at a time different than a time of the allocated resources. For example, the UE 115 may receive the second grant allocating second resources within the shared data channel when multiple HARQ processes are enabled. In some cases, the time duration includes an amount of time to enable the wireless device to receive a second instance of the control channel on the first carrier or a second carrier of the plurality of carriers prior to the transmitting or receiving over the shared data channel using the allocated resources. The operations of block 2115 may be performed according to the methods described with reference to FIGS. 1 through 12. In certain examples, aspects of the operations of block 2115 may be performed by a monitoring component as described with reference to FIGS. 13 through 16.

In some options, at block 2120 the UE 115 may determine, based at least in part on first and second carrier indices, that the allocated resources and the second allocated resources are not allocated on a same carrier of the plurality of carriers. In some cases, a time gap between a timing of the allocated resources and a timing of the second allocated resources may be based at least in part on the allocated resources and the second allocated resources not being on a same carrier. The operations of block 2120 may be performed according to the methods described with reference to FIGS. 1 through 12. In certain examples, aspects of the operations of block 2120 may be performed by a monitoring component as described with reference to FIGS. 13 through 16.

In some options, at block 2125 the UE 115 may determine, based at least in part on first and second carrier indices, that a carrier of the plurality of carriers for a first uplink transmission differs from a carrier of the plurality of carriers for a second uplink transmission. In some cases, a time gap between a timing of the first uplink transmission and a timing of the second uplink transmission is based at least in part on the carrier for the first uplink transmission differing from the carrier for the second uplink transmission. The operations of block 2125 may be performed according to the methods described with reference to FIGS. 1 through 12. In certain examples, aspects of the operations of block 2125 may be performed by a monitoring component as described with reference to FIGS. 13 through 16.

In some options, at block 2130 the UE 115 may monitor for a reference signal (e.g., an SRS or NRS) on a carrier of the plurality of carriers within a time interval that includes a first defined amount of time prior to a beginning of a scheduled transmission to the wireless device on the carrier and a second defined amount of time after an end of the scheduled transmission. The operations of block 2130 may be performed according to the methods described with reference to FIGS. 1 through 12. In certain examples, aspects of the operations of block 2130 may be performed by a monitoring component as described with reference to FIGS. 13 through 16.

In some options, at block 2135 the UE 115 may refrain from monitoring the carrier for the reference signal outside of the time interval. The operations of block 2135 may be performed according to the methods described with reference to FIGS. 1 through 12. In certain examples, aspects of the operations of block 2135 may be performed by a monitoring component as described with reference to FIGS. 13 through 16.

Figure 22:
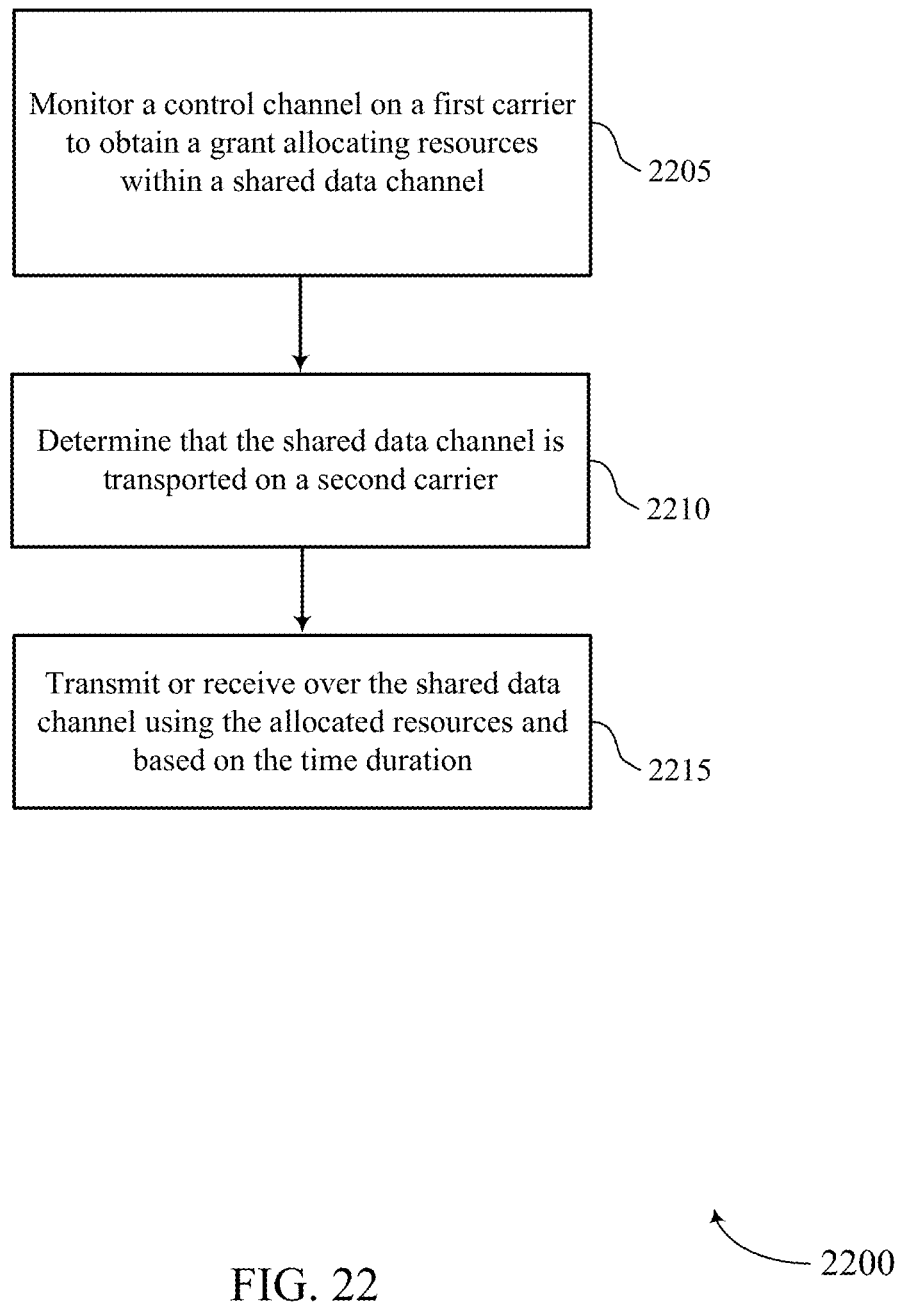

FIG. 22 shows a flowchart illustrating a method 2200 for cross-carrier scheduling for wireless devices in accordance with aspects of the present disclosure. The operations of method 2200 may be implemented by a UE 115 or its components as described herein. For example, the operations of method 2200 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may monitor, by a wireless device, a control channel on a first carrier of a plurality of carriers to obtain a grant allocating resources to the wireless device within a shared data channel, wherein a time duration between the grant and the allocated resources within the shared data channel is based at least in part on which carrier of the plurality of carriers transports the shared data channel. The UE 115 may perform monitoring as described above in block 2105. The operations of block 2205 may be performed according to the methods described with reference to FIGS. 1 through 12. In certain examples, aspects of the operations of block 2205 may be performed by a monitoring component as described with reference to FIGS. 13 through 16.

At block 2210 the UE 115 may determine, based at least in part on the grant, that the shared data channel is transported on a second carrier of the plurality of carriers, the second carrier differing from the first carrier. The UE 115 may, example, process DCI included in the grant 410 to determine that the UE 115 is being cross-carrier scheduled, and that the UE 115-*a* has been allocated resources on a different carrier (e.g., PDSCH carrier, PUSCH carrier, etc.). The operations of block 2210 may be performed according to the methods described with reference to FIGS. 1 through 12. In certain examples, aspects of the operations of block 2210 may be performed by a monitoring component as described with reference to FIGS. 13 through 16.

At block 2215 the UE 115 may transmit or receive over the shared data channel using the allocated resources and based at least in part on the time duration. The UE 115 may cause transmitter 1320 or the receiver 1320 to tune to the different carrier. If transmitting, the UE 115 may attempt to transmit using an uplink transmission on the different carrier corresponding to the time duration (e.g., transmit PUSCH on PUSCH carrier after time duration 425). If receiving, the UE 115 may attempt to receive and decode the downlink shared data channel on the different carrier corresponding to the time duration (e.g., decode PDSCH on PDSCH carrier after time duration 425). The operations of block 2215 may be performed according to the methods described with reference to FIGS. 1 through 12. In certain examples, aspects of the operations of block 2215 may be performed by a resource allocator as described with reference to FIGS. 13 through 16.

Figure 23:
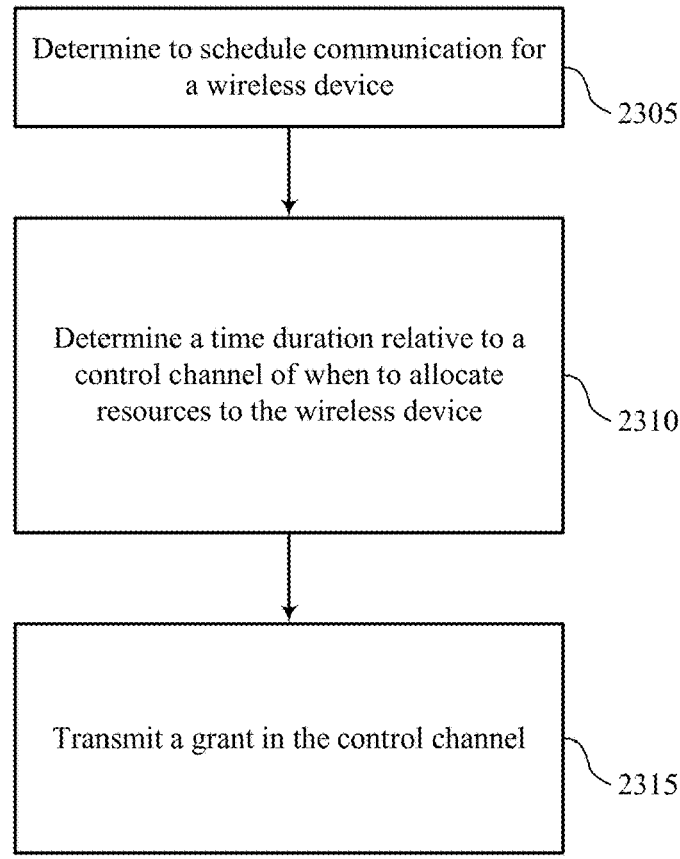

FIG. 23 shows a flowchart illustrating a method 2300 for cross-carrier scheduling for wireless devices in accordance with aspects of the present disclosure. The operations of method 2300 may be implemented by a base station 105 or its components as described herein. For example, the operations of method 2300 may be performed by a base station communications manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At block 2305 the base station 105 may determine to schedule communication for a wireless device. The base station 105 may, for example, receive a scheduling request at receiver 1710 from the UE 115 requesting resources on a shared data channel for a PUSCH transmission. In another example, the base station 105 may determine that downlink data is available or will be available for transmission to the UE 115. The operations of block 2305 may be performed according to the methods described with reference to FIGS. 1 through 12. In certain examples, aspects of the operations of block 2305 may be performed by a scheduler component as described with reference to FIGS. 17 through 20.

At block 2310 the base station 105 may determine a time duration relative to a control channel of when to allocate resources to the wireless device for the communication, wherein the time duration is based at least in part on which carrier of a plurality of carriers transports a shared data channel. In an example, the base station communications manager 1715 of the base station 105 may determine on which carrier of multiple carriers to allocate resources to the UE 115, and may determine capability information for the UE 115. If resources are being allocated on the same carrier as used for a control channel, the base station communications manager 1715 of the base station 105 may not allocate any additional time for the UE 115 to tune between carriers. If resources are being allocated on different carrier than the carrier transporting the control channel, the base station 105 may determine the time duration that includes additional time for the UE 115 to tune between carriers (e.g., one or more additional subframes, radio frames, a defined additional amount of time, or the like). The amount of additional amount of time may be a function of capabilities of the UE 115. The operations of block 2310 may be performed according to the methods described with reference to FIGS. 1 through 12. In certain examples, aspects of the operations of block 2310 may be performed by a time duration component as described with reference to FIGS. 17 through 20.

At block 2315 the base station 105 may transmit a grant in the control channel to the wireless device identifying a timing of the allocated resources within the shared data channel based at least in part on the time duration. In an example, the transmitter 1720 may transmit a grant within a PDCCH channel transported on a PDCCH carrier. The grant 410 may allocate PUSCH resources, PDSCH resources, or both, to the UE 115 on one or more carriers that may, or might not, include the PDCCH carrier. A beginning of the allocated resources may correspond to an end of the time duration 425. The operations of block 2315 may be performed according to the methods described with reference to FIGS. 1 through 12. In certain examples, aspects of the operations of block 2315 may be performed by a grant component as described with reference to FIGS. 17 through 20.

Figure 24:
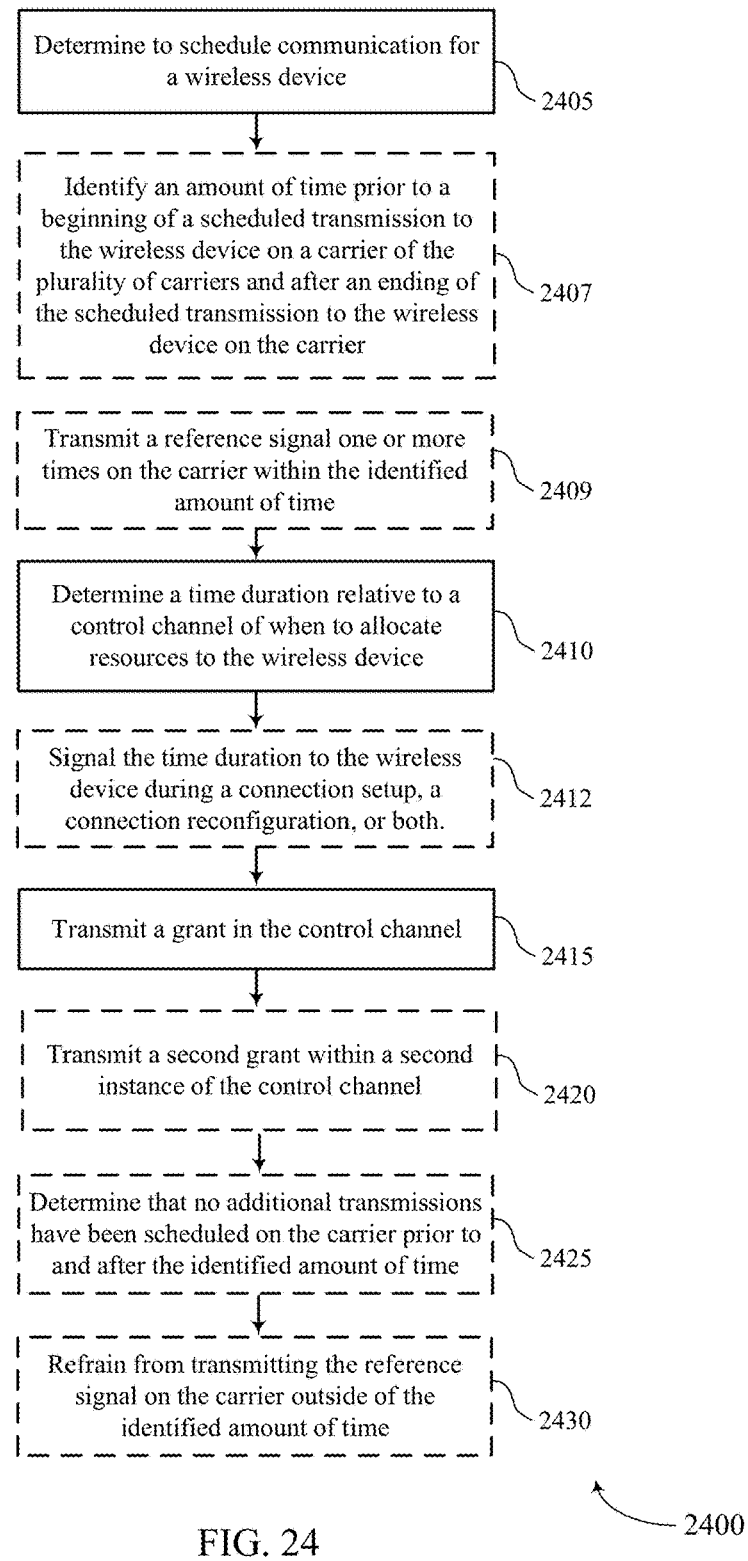

FIG. 24 shows a flowchart illustrating a method 2400 for cross-carrier scheduling for wireless devices in accordance with aspects of the present disclosure. The operations of method 2400 may be implemented by a base station 105 or its components as described herein. For example, the operations of method 2400 may be performed by a base station communications manager as described with reference to FIGS. 17 through 20. In some examples, a base station 105 may execute a set of codes to control the functional elements of the device to perform the functions described below. Additionally or alternatively, the base station 105 may perform aspects of the functions described below using special-purpose hardware.

At block 2405 the base station 105 may determine to schedule communication for a wireless device. Block 2305 is an example of block 2405. The operations of block 2405 may be performed according to the methods described with reference to FIGS. 1 through 12. In certain examples, aspects of the operations of block 2405 may be performed by a scheduler component as described with reference to FIGS. 17 through 20.

In some options, at block 2407 the base station 105 may identify an amount of time prior to a beginning of a scheduled transmission to the wireless device on a carrier of the plurality of carriers and after an ending of the scheduled transmission to the wireless device on the carrier. The operations of block 2407 may be performed according to the methods described with reference to FIGS. 1 through 12. In certain examples, aspects of the operations of block 2407 may be performed by a scheduler component as described with reference to FIGS. 17 through 20.

In some options, at block 2407 the base station 105 may transmit a reference signal (e.g., an SRS or NRS) one or more times on the carrier within the identified amount of time. The operations of block 2409 may be performed according to the methods described with reference to FIGS. 1 through 12. In certain examples, aspects of the operations of block 2409 may be performed by a scheduler component as described with reference to FIGS. 17 through 20.

At block 2410 the base station 105 may determine a time duration relative to a control channel of when to allocate resources to the wireless device for the communication, wherein the time duration is based at least in part on which carrier of a plurality of carriers transports a shared data channel. Block 2310 is an example of block 2410. In some cases, the time duration enables the UE 115 to receive a second instance of the control channel prior to transmitting or receiving over the shared data channel using the allocated resources. The operations of block 2410 may be performed according to the methods described with reference to FIGS. 1 through 12. In certain examples, aspects of the operations of block 2410 may be performed by a time duration component as described with reference to FIGS. 17 through 20.

In some options, at block 2412 the base station 105 may signal the time duration to the wireless device during a connection setup, a connection reconfiguration, or both (e.g., using RRC signaling). The operations of block 2412 may be performed according to the methods described with reference to FIGS. 1 through 12. In certain examples, aspects of the operations of block 2412 may be performed by a time duration component as described with reference to FIGS. 17 through 20.

At block 2415 the base station 105 may transmit a grant in the control channel to the wireless device identifying a timing of the allocated resources (e.g., each set of allocated resources may be associated with a different time and different transport block) within the shared data channel, the timing of the allocated resources being based at least in part on the time duration. Block 2315 is an example of block 2415. The operations of block 2415 may be performed according to the methods described with reference to FIGS. 1 through 12. In certain examples, aspects of the operations of block 2415 may be performed by a grant component as described with reference to FIGS. 17 through 20.

In some options, at block 2420 the base station 105 may transmit a second grant within the second instance of the control channel, the second grant allocating second resources within the shared data channel at a time different than a time of the allocated resources. In an example, the base station communications manager 1715 of the base station 105 may determine that HARQ is enabled, and may cause transmitter 1720 to transmit a second grant within a second instance of a PDCCH on a PDCCH carrier. In some cases, the time duration may include an amount of time based at least in part on the control channel being transported on a first carrier of the plurality of carriers and the shared data channel being transported on a second carrier of the plurality of carriers. In some cases, the first carrier is a different carrier from the second carrier. The operations of block 2420 may be performed according to the methods described with reference to FIGS. 1 through 12. In certain examples, aspects of the operations of block 2420 may be performed by a grant component as described with reference to FIGS. 17 through 20.

In some options, at block 2425 the base station 105 may determine that no additional transmissions have been scheduled on the carrier prior to and after the identified amount of time. The operations of block 2425 may be performed according to the methods described with reference to FIGS. 1 through 12. In certain examples, aspects of the operations of block 2425 may be performed by a grant component as described with reference to FIGS. 17 through 20.

In some options, at block 2430 the base station 105 may refrain from transmitting the reference signal (e.g., an SRS or NRS) on the carrier outside of the identified amount of time. The operations of block 2430 may be performed according to the methods described with reference to FIGS. 1 through 12. In certain examples, aspects of the operations of block 2430 may be performed by a grant component as described with reference to FIGS. 17 through 20.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    monitoring, by a wireless device, a control channel on a first carrier of a plurality of carriers to obtain a grant allocating resources to the wireless device within a shared data channel, wherein a time duration between the grant and the allocated resources within the shared data channel is based at least in part on whether the first carrier or a second carrier of the plurality of carriers transports the shared data channel, the first carrier differing from the second carrier; and
    transmitting or receiving over the shared data channel using the allocated resources and based at least in part on the time duration.

2. The method of claim 1, wherein the time duration includes an added amount of time and a defined amount of time based at least in part on the transmitting or receiving occurring via the second carrier.

3. The method of claim 1, wherein, when multiple Hybrid Automatic Repeat reQuest (HARQ) processes are enabled, the time duration includes an amount of time to enable the wireless device to receive a second instance of the control channel on the first carrier or the second carrier of the plurality of carriers prior to the transmitting or receiving over the shared data channel using the allocated resources.

4. The method of claim 3, wherein the time duration includes an amount of time between the second instance of the control channel and a beginning of the allocated resources.

5. The method of claim 3, further comprising:
    receiving a second grant within the second instance of the control channel, the second grant allocating second resources within the shared data channel at a time different than a time of the allocated resources.

6. The method of claim 5, further comprising:
    determining, based at least in part on first and second carrier indices, that the allocated resources and the second allocated resources are not allocated on a same carrier of the plurality of carriers, wherein a time gap between a timing of the allocated resources and a timing of the second allocated resources is based at least in part on the allocated resources and the second allocated resources not being on a same carrier.

7. The method of claim 5, further comprising:
    determining, based at least in part on first and second carrier indices, that a carrier of the plurality of carriers for a first uplink transmission differs from a carrier of the plurality of carriers for a second uplink transmission, wherein a time gap between a timing of the first uplink transmission and a timing of the second uplink transmission is based at least in part on the carrier for the first uplink transmission differing from the carrier for the second uplink transmission.

8. The method of claim 1, wherein, when Hybrid Automatic Repeat reQuest (HARQ) with multiple HARQ processes is enabled, the time duration includes an amount of time to enable the wireless device to receive a second instance of the control channel on the first carrier or the second carrier of the plurality of carriers prior to the transmitting or receiving over the shared data channel using the allocated resources, the method further comprising:
    receiving a second grant within the second instance of the control channel, the second grant allocating second resources within the shared data channel at a time different than a time of the allocated resources, the second allocated resources and the allocated resources being on a same carrier.

9. The method of claim 1, further comprising:
    monitoring, by the wireless device, for a reference signal on a carrier of the plurality of carriers within a time interval that includes a first defined amount of time prior to a beginning of a scheduled transmission to the wireless device on the carrier and a second defined amount of time after an end of the scheduled transmission; and
    refraining from monitoring the carrier for the reference signal outside of the time interval.

10. The method of claim 1, wherein the time duration is an amount of time, a number of subframes, or both.

11. The method of claim 1, wherein the time duration is based at least in part on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof.

12. A method for wireless communication, comprising:
    determining a time duration relative to a control channel of when to allocate resources to a wireless device, wherein the time duration is based at least in part on whether a first carrier or a second carrier of a plurality of carriers transports a shared data channel, the first carrier differing from the second carrier; and
    transmitting a grant in the control channel to the wireless device identifying a timing of the allocated resources within the shared data channel, the timing of the allocated resources being based at least in part on the time duration.

13. The method of claim 12, wherein the time duration includes an amount of time based at least in part on the control channel being transported on the first carrier of the plurality of carriers and the shared data channel being transported on the second carrier of the plurality of carriers.

14. The method of claim 12, wherein the time duration enables the wireless device to receive a second instance of the control channel prior to transmitting or receiving over the shared data channel using the allocated resources.

15. The method of claim 14, wherein the time duration includes an amount of time between the second instance of the control channel and a beginning of the allocated resources.

16. The method of claim 14, further comprising:
transmitting a second grant within the second instance of the control channel, the second grant allocating second resources within the shared data channel at a time different than a time of the allocated resources.

17. The method of claim 12, further comprising:
identifying an amount of time prior to a beginning of a scheduled transmission to the wireless device on a carrier of the plurality of carriers and after an ending of the scheduled transmission to the wireless device on the carrier;
transmitting a reference signal one or more times on the carrier within the identified amount of time;
determining that no additional transmissions have been scheduled on the carrier prior to and after the identified amount of time; and
refraining from transmitting the reference signal on the carrier outside of the identified amount of time.

18. The method of claim 12, wherein the grant includes the time duration.

19. The method of claim 12, further comprising:
signaling the time duration to the wireless device during a connection setup, a connection reconfiguration, or both.

20. The method of claim 12, wherein the grant allocates second resources within the shared data channel at a time different than a time of the allocated resources.

21. The method of claim 12, wherein the time duration is based at least in part on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof.

22. An apparatus for wireless communication, in a system comprising:
a processor;
memory coupled with the processor; and
instructions stored in the memory and operable, when executed by the processor, to cause the apparatus to:
monitor a control channel on a first carrier of a plurality of carriers to obtain a grant allocating resources to a wireless device within a shared data channel, wherein a time duration between the grant and the allocated resources within the shared data channel is based at least in part on whether a first carrier or a second carrier of the plurality of carriers transports the shared data channel, the first carrier differing from the second carrier; and
transmit or receive over the shared data channel using the allocated resources and based at least in part on the time duration.

23. The apparatus of claim 22, wherein monitoring the control channel comprises further instructions executable by the processor to:
determine, based at least in part on the grant, that the shared data channel is transported on the second carrier of the plurality of carriers, and wherein the time duration includes an added amount of time and a defined amount of time based at least in part on transmitting or receiving over the shared data channel occurring via the second carrier.

24. The apparatus of claim 22, wherein, when Hybrid Automatic Repeat reQuest (HARQ) is enabled, the time duration includes an amount of time to enable the wireless device to receive a second instance of the control channel on the first carrier or the second carrier of the plurality of carriers prior to the transmitting or receiving over the shared data channel using the allocated resources.

25. The apparatus of claim 22, wherein the instructions are further executable by the processor to:
monitor for a reference signal on a carrier of the plurality of carriers within a time interval that includes a first defined amount of time prior to a beginning of a scheduled transmission to the wireless device on the carrier and a second defined amount of time after an end of the scheduled transmission; and
refrain from monitoring the carrier for the reference signal outside of the time interval.

26. The apparatus of claim 22, wherein the time duration is based at least in part on whether Hybrid Automatic Repeat reQuest (HARQ) is enabled, whether the grant is for uplink or downlink, whether the grant is received in a first or second instance of the control channel, whether cross-carrier scheduling is enabled, or any combination thereof.

27. An apparatus for wireless communication, in a system comprising:
a processor;
memory coupled with the processor; and
instructions stored in the memory and operable, when executed by the processor, to cause the apparatus to:
determine a time duration relative to a control channel of when to allocate resources to a wireless device, wherein the time duration is based at least in part on whether a first carrier or a second carrier of a plurality of carriers transports a shared data channel, the first carrier differing from the second carrier; and
transmit a grant in the control channel to the wireless device identifying a timing of the allocated resources within the shared data channel, the timing of the allocated resources being based at least in part on the time duration.

28. The apparatus of claim 27, wherein the time duration includes an amount of time based at least in part on the control channel being transported on the first carrier of the plurality of carriers and the shared data channel being transported on the second carrier of the plurality of carriers.

29. The apparatus of claim 27, wherein the time duration enables the wireless device to receive a second instance of the control channel prior to transmitting or receiving over the shared data channel using the allocated resources, and wherein the instructions are further executable by the processor to:
transmit a second grant within the second instance of the control channel, the second grant allocating second resources within the shared data channel at a time different than a time of the allocated resources.

30. The apparatus of claim 27, wherein the instructions are further executable by the processor to:
identify an amount of time prior to a beginning of a scheduled transmission to the wireless device on a carrier of the plurality of carriers and after an ending of the scheduled transmission to the wireless device on the carrier;
transmit a reference signal one or more times on the carrier within the identified amount of time;

determine that no additional transmissions have been scheduled on the carrier prior to and after the identified amount of time; and refrain from transmitting the reference signal on the carrier outside of the identified amount of time.

* * * * *